US011966659B2

(12) United States Patent
Agrawal et al.

(10) Patent No.: US 11,966,659 B2
(45) Date of Patent: Apr. 23, 2024

(54) CONTEXT-BASED DISPLAY OF CONTENT ON A MULTI-DISPLAY SYSTEM

(71) Applicant: Motorola Mobility LLC, Chicago, IL (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/689,343

(22) Filed: Mar. 8, 2022

(65) Prior Publication Data
US 2023/0289124 A1 Sep. 14, 2023

(51) Int. Cl.
G06F 3/14 (2006.01)
G06F 1/16 (2006.01)
G06F 3/01 (2006.01)
G06F 40/58 (2020.01)

(52) U.S. Cl.
CPC .......... *G06F 3/1423* (2013.01); *G06F 1/1601* (2013.01); *G06F 3/011* (2013.01); *G06F 40/58* (2020.01)

(58) Field of Classification Search
CPC ...... G06F 3/1423; G06F 40/58; G06F 1/1601; G06F 3/011
See application file for complete search history.

(56) References Cited

U.S. PATENT DOCUMENTS

| 9,886,228 | B2* | 2/2018 | Kim ....................... G06F 3/018 |
| 10,645,292 | B2 | 5/2020 | Park et al. |
| 11,720,312 | B2 | 8/2023 | Nomiso et al. |
| 2014/0098004 | A1 | 4/2014 | Ngo et al. |
| 2014/0310643 | A1 | 10/2014 | Karmanenko et al. |
| 2017/0094132 | A1 | 3/2017 | Miyata |
| 2017/0161006 | A1 | 6/2017 | Kwon et al. |
| 2017/0199614 | A1 | 7/2017 | Lee et al. |
| 2017/0205923 | A1 | 7/2017 | Shim et al. |
| 2018/0198987 | A1 | 7/2018 | Park et al. |
| 2022/0070363 | A1* | 3/2022 | Machuca ................ G06T 7/246 |

(Continued)

FOREIGN PATENT DOCUMENTS

| EP | 3779643 A1 | | 2/2021 |
| KR | 10-20050023128 | * | 9/2006 |
| WO | 2019153733 A1 | | 8/2019 |

OTHER PUBLICATIONS

U.S. Appl. No. 17/209,146, "Non-Final Office Action", U.S. Appl. No. 17/209,146, filed May 25, 2022, 13 pages.

(Continued)

*Primary Examiner* — Doon Y Chow
(74) *Attorney, Agent, or Firm* — FIG. 1 Patents

(57) ABSTRACT

Techniques for context-based display of content and alert based on distance on a multi-display system are described. For instance, the described techniques can be implemented to determine a device context based on one or more of a first instance of media content displayed on a first display device positioned at a first surface of a client device or an environment in which the client device is positioned. Based on the device context, the described techniques enable output of a second instance of media content via a second display device positioned at a second surface of the client device.

20 Claims, 14 Drawing Sheets

(56) References Cited

U.S. PATENT DOCUMENTS

2022/0198155 A1* 6/2022 Olsen .................. G06F 40/58
2022/0300234 A1   9/2022 Nomiso et al.
2022/0300589 A1* 9/2022 Kumar Agrawal ... H04M 1/673
2023/0292086 A1   9/2023 Desai et al.

OTHER PUBLICATIONS

Desai, Rahul, et al., "U.S. Application as Filed", U.S. Appl. No. 17/689,358, filed Mar. 8, 2022, 75 pages.
Nomiso, Lúcia, et al., "U.S. Application as Filed", U.S. Appl. No. 17/209,146, filed Mar. 22, 2021, 51 pages.
U.S. Appl. No. 17/209,146, "Final Office Action", U.S. Appl. No. 17/209,146, filed Oct. 25, 2022, 19 pages.
GB2203208.0, "Combined Search and Examination Report", GB Application No. GB2203208.0, dated Jul. 20, 2022, 8 pages.
PLUGABLE, "How to Use PowerPoint on Multiple Displays", YouTube video entitled: "How to Use PowerPoint on Multiple Displays," uploaded Mar. 30, 2020 by user "Plugable" [retrieved Aug. 10, 2022]. Retrieved from the Internet <https://www.youtube.com/watch?v=8BwNWxyxI6A>, Mar. 30, 2020, 4 pages.
U.S. Appl. No. 17/209,146, "Notice of Allowance", U.S. Appl. No. 17/209,146, filed Apr. 6, 2023, 8 pages.
U.S. Appl. No. 17/209,146, "Supplemental Notice of Allowability", U.S. Appl. No. 17/209,146, filed Jun. 23, 2023, 3 pages.

* cited by examiner

CONTEXT-BASED DISPLAY OF CONTENT ON A MULTI-DISPLAY SYSTEM

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Modern portable devices are particularly useful for inter-personal communication and interaction.

BRIEF DESCRIPTION OF THE DRAWINGS

Aspects of context-based display of content and alert based on distance in a multi-display system are described with reference to the following Figures. The same numbers may be used throughout to reference similar features and components that are shown in the Figures. Further, identical numbers followed by different letters reference different instances of features and components described herein.

DETAILED DESCRIPTION

Figure 1:
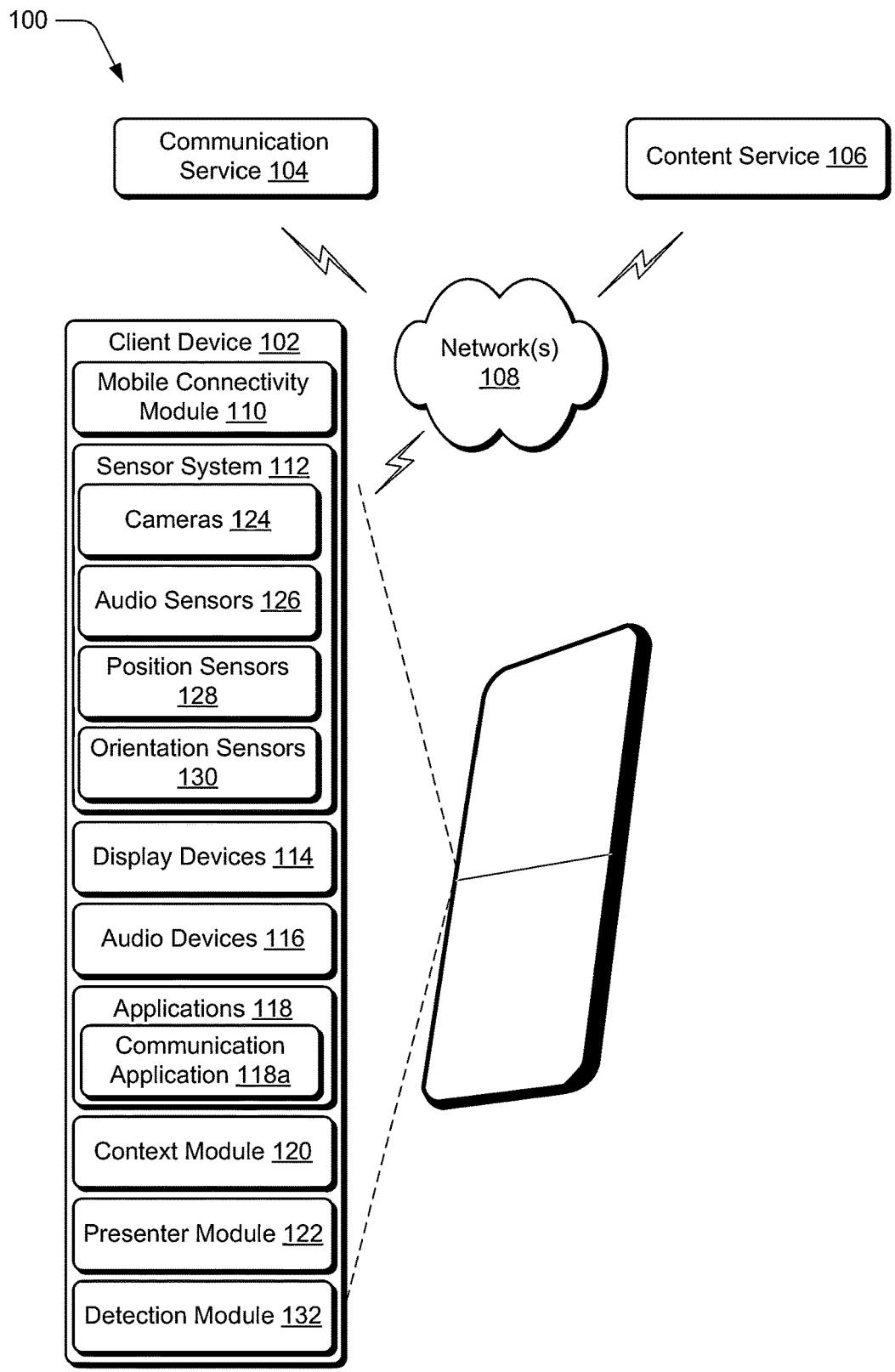
FIG. 1 illustrates an example environment in which aspects of context-based display of content and alert based on distance in a multi-display system can be implemented.

Techniques for context-based display of content and alert based on distance in a multi-display system are described. For instance, according to implementations for context-based display of content on a multi-display system, output of content on different display devices is adaptable based on different device contexts. Further, according to implementations for alert based on distance in a multi-display display system, alerts can be output if a person other than a user is located within a threshold distance of a device. The described techniques can be implemented in the context of a client device that includes two or more display devices. The display devices, for instance, may be positioned at different surfaces of the client device. Further, the different surfaces may be incorporated together in a single housing or may be incorporated in separate housings attached via a hinge region such that the housings are pivotable relative to one another. The client device, for example, represents a foldable device, e.g., a foldable smartphone.

Person-to-person contact can be challenging in a number of situations. For example, a visitor to a foreign country may have difficulty communicating with other people who do not speak the same language. Conventional applications on client devices with a single display may perform translation functions, but communication involving the translation requires the display of the client device to be in view of both users or for the client device to be passed between each user to view the translation, which is a confusing and cumbersome process. In other situations, in-person sharing of information with others using a single-display client device is also confusing because both users view the same content, some of which is not pertinent to one of the users. Additionally, health restrictions may prohibit users from coming into close contact to view the same display of a client device or to pass the client device back and forth. In other situations, one person may wish to communicate their desire that other people physically distance themselves from the person, either because the person does not wish to spread or contract a contagious disease, or for other reasons. However, conventional methods do not provide an effective way to communicate this desire to others.

To address these situations, techniques for context-based display of content on a multi-display system are described. For instance, output of content on different display devices is adaptable based on different device contexts. Examples of different device contexts include an application running on the device, a location of the device (e.g., geographic location), date, time, device motion, a person and/or object detected in proximity to the device, and so forth. For instance, when first content is displayed on a first display device of a client device, device context for the client device is determined and used to determine second content for display on a second display device of the client device. The second content, for instance, represents a modified version of the first content, a different instance of content, and so forth.

Consider, for example, a scenario where a client device user is visiting a foreign country and is unfamiliar with the local language. Sensors on the client device, for instance, collect location information (e.g., Global Positioning System (GPS) coordinates) and the client device determines that the client device is positioned in the foreign country based on the location information. Techniques for context-based display of content on a multi-display system can enable the user to utilize the client device to communicate with another person in the local language while maintaining distance from the other person. The user, for example, inputs a phrase to translate to the client device, such as via an application on the client device. The client device, based on the known position of the client device in the foreign country, generates a translation of the input phrase into the local language. The input phrase is displayed in one language (e.g., a default language for the user) on a first display of the client device facing the user, while a translation of the phrase in a different language (e.g., the local language) is displayed on a second display of the client device, e.g., a display which is facing the other person. The translation of the phrase, for instance, represents a modified (e.g., translated) version of the input phrase.

Thus, context-based display of content on a multi-display system enables the two persons to effectively communicate without the need to be in close proximity because the second user can view a translation on a display positioned at a surface that is not the same surface facing the first user. This also provides an effective translation method because it allows for different content to be displayed on each display of a client device, so a translation can be viewed in a different language on each display of a client device.

In another example implementation, techniques for context-based display of content on a multi-display system are implemented to obtain, based on content displayed on a first display device of a client device, contextually-related content for display on a second display device of the client device. The contextually-related content, for instance, is obtained based on device context information for the client device, examples of which are discussed throughout this disclosure.

Consider, for instance, that a client device user about to board a flight at an airport. Context-based display of content on a multi-display system allows the user to communicate with another person or device at the airport while each views pertinent information on the client device. In this example, the client device has a first display device, including a display screen, on a first surface and a second display device, including different display screen, on a second surface. Further, in at least one implementation, the client device determines that the client device located at the airport, such as based on location information obtained by sensors of the client device.

Further to this example, a user of the client device views a first instance of media content displayed on the first display device, e.g., a display device that is facing the user. The first instance of media content, for instance, is displayed in response to input from the first user to an application executed on the hardware of the client device. The first instance of media content includes a first set of information pertaining to the user's flight, e.g., flight number, gate number, boarding time, etc. Based on device context information, the client device determines a second instance of media content for display on the second display device. The device context information, for example, indicates that the client device is located at the airport and that the first set of flight information is displayed on the first display device.

Thus, based on the device context, the client device generates a second set of information for inclusion as part of the second instance of media content. The second set of information, for example, includes permissioning information that is usable to allow the user to perform various tasks, such as to obtain permission to pass a security procedure, to board a flight, and so forth. In at least one implementation, the second set of information includes different information than the first set of information. The second set of information, for example, includes content that is not included as part of the first set of information displayed in the first set of information in the first instance of media content. In this scenario examples of the second set of information include other flight-related information such as machine-readable optical code (e.g., a barcode, a QR code, etc.) that contains information about the user and the user's flight, the user's name, seat number, boarding group, etc.

Accordingly, another entity such as a flight attendant, security officer, or automated check-in device, is able to view the second instance of media content on the second display device. For instance, instead of seeing the first set of information (e.g., the user's flight number, gate number, and boarding time), the other entity sees the second set of information, e.g., information usable to enable the user to gain entry to their flight and/or to guide the user to their assigned seat. For instance, another person such as flight-related personnel may view the first user's name presented on the second display to greet the user, use a scanner device to scan the ticket optical code displayed on the second display, and guide the user to their seat using the seat number displayed on the second display device. In at least one implementation information from the first set of information on the first display device (e.g., flight number, gate number, boarding time, etc.) are not displayed on the second display device.

Thus, the described techniques can provide an effective communication method that prevents crowding of information on the first display device and the second display device by filtering information based on device context and presenting information on different display devices that is pertinent to persons and/or entities that are positioned to view the respective display devices.

Implementations for alert based on distance in a multi-display system are operable to output an alert if a person other than the user is located within a threshold distance of the client device. For instance, a sensor system detects that a user is in possession of the client device and detects a person other than the user located within a threshold distance of the client device. An alert is caused to be output based on the detection of the person located within the threshold distance of the client device.

For instance, consider a scenario where a client device user does not want to be in close proximity to other people. A sensor system on the client device monitors various device context information such as user presence and proximity of other persons to the client device. For instance, the sensor system detects that the user is in possession of the client device. Further, the sensor system detects a person other than the user located within a threshold distance of the client device. The sensor system, for example, collects sensor data such as optical data (e.g., via a camera), audio data, temperature data, and so forth, to monitor presence of other persons relative to the client device in possession of the user. Based on the detection of the person within the threshold distance of the client device, an alert is caused to be output by the client. In at least one implementation, the alert is a visual alert displayed on the display of the user's client device that warns the detected person to maintain a threshold distance from the client device and/or the user. The display, for instance, represents a display that is positioned on the client device to be viewable by the person detected within the threshold proximity to the client device. Other types of alerts may additionally or alternatively be employed, such as audible alerts, haptic alerts, and so forth. A threshold distance can be defined in various ways, such as a system default distance, a user configured distance, a variable context-based distance, and so forth. Thus, implementations enable a user to communicate their desire that other persons physically distance themselves from the user for various reasons, e.g., the user does not wish to spread or contract a contagious disease, or for other reasons.

While features and concepts of context-based display of content and alert based on distance in a multi-display system can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of context-based display of content and alert based on distance in a multi-display system can be implemented. The environment 100 includes a client device 102, a communication service 104, and a content service 106 that are interconnectable via network(s) 108. In this particular example, the client device 102 represents a mobile device, such as a smartphone, a foldable smartphone, a foldable tablet device, a foldable laptop device, and so forth. Example attributes of the client device 102 are discussed below with reference to the device 1100 of FIG. 11.

The client device 102 includes various functionality that enables the client device 102 to perform different aspects of context-based display of content and alert based on distance in a multi-display system discussed herein, including a mobile connectivity module 110, sensor system 112, display devices 114, audio devices 116, applications 118, a context module 120, and a presenter module 122. The mobile connectivity module 110 represents functionality (e.g., logic and hardware) for enabling the client device 102 to interconnect with other devices and/or networks, such as the network 108. The mobile connectivity module 110, for instance, enables wireless and/or wired connectivity of the client device 102.

The sensor system 112 is representative of functionality to detect various physical and/or logical phenomena in relation to the client device 102, such as motion, light, image detection and recognition, time and date, position, location, touch detection, sound, temperature, and so forth. Examples of the sensor system 112 includes hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In this particular example the sensor system 112 includes cameras 124, audio sensors 126, position sensors 128, and orientation sensors 130. The sensor system 112, however, can include a variety of other sensor types in accordance with the implementations discussed herein.

The display devices 114 represent functionality for outputting visual content via the client device 102. As further detailed below, for instance, the client device 102 includes multiple display devices 114 that can be leveraged for outputting content. The audio devices 116 represent functionality for providing audio output for the client device 102. In at least one implementation the client device 102 includes audio devices 116 positioned at different regions of the client device 102, such as to provide for different audio output scenarios. The applications 118 represent functionality for performing different computing tasks via the client device 102, such as gaming, media consumption (e.g., content streaming), productivity tasks (e.g., word processing, content generation, data analysis, etc.), content generation, web browsing, communication with other devices, and so forth. In this particular example the applications 118 include a communication application 118a which represents functionality for enabling the client device 102 to engage in communication with other devices. The communication application 118a, for instance, represents a portal for interfacing with the communication service 104, such as for enabling communication (e.g., call sessions) between users of different devices.

The context module 120 represents functionality for determining device context based on various factors such as sensor data from the sensor system 112, applications 118 executing on the client device 102, and so forth. For instance, the context module 120 may determine device context based on an environment in which the client device 102 is positioned by utilizing sensor data captured by the sensor system 112. The presenter module 122 represents functionality for performing various aspects pertaining to context-based display of content and alert based on distance in a multi-display system in accordance with various implementations.

The client device 102 also includes a detection module 132, which represents functionality for detecting and recognizing objects detected by the sensor system 112. For instance, utilizing video data captured by the cameras 124, the detection module 132 can detect visual objects present in the video data, such as persons and other visual objects. Various other types of sensor data may additionally or alternatively be used by the detection module 132, such as audio data captured by the audio sensors 126. The detection module 132 also represents functionality for determining a proximity or distance of objects and persons detected by the sensor system 112 to the client device 102.

Figure 2A:
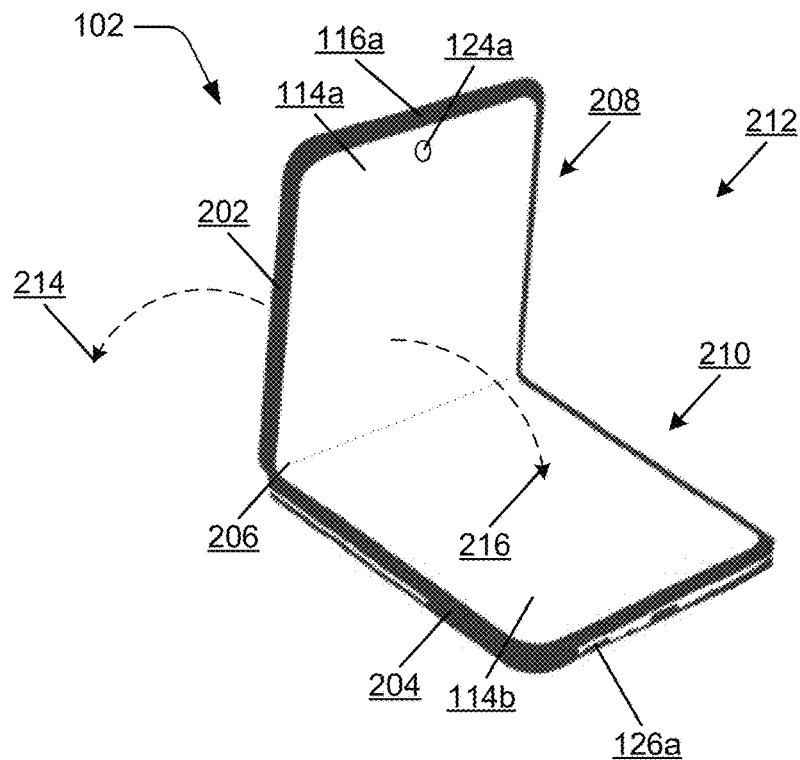
FIG. 2a illustrates features of a client device in accordance with one or more implementations.

FIG. 2a illustrates features of the client device 102 in accordance with one or more implementations. The view depicted in FIG. 2a, for instance, represents a front-facing view of the client device 102. The client device 102 includes a first housing 202 attached to a second housing 204 via a hinge region 206. The first housing 202 and/or the second housing 204, for instance, are pivotable about the hinge region 206 to assume a variety of different angular orientations relative to one another. The first housing 202 includes a display device 114a positioned on a front surface 208 of the first housing 202, and the second housing 204 includes a display device 114b positioned on a front surface 210 of the second housing 204. The client device 102 further includes a camera 124a positioned on the front surface 208 of the first housing 202. The camera 124a is positionable in various ways, such as within the perimeter of the display device 114a and/or underneath the display device 114a. Alternatively or additionally, the camera 124a is positionable adjacent the display device 114a.

In the depicted orientation the client device 102 is in a partially open position 212 with the first housing 202 pivoted away from the second housing 204. The first housing 202 is further pivotable about the hinge region 206 away from the second housing 204 to a fully open position 214. In the fully open position 214, for instance, the first housing 202 is substantially coplanar with the second housing 204. For example, in the fully open position 214 the display device 114a and the display device 114b are coplanar and form a single integrated display surface. The first housing 202 is also pivotable about the hinge region 206 to a closed position 216 where the display device 114a is positioned against the display device 114b. In at least one implementation the orientation sensor is able to detect an orientation of the client device 102, e.g., based on an orientation of the first housing 202 relative to the second housing 204. The orientation sensor, for instance, can detect an angle of the first housing 202 relative to the second housing 204, and/or an amount of pivoting motion and/or rotation of the hinge region 206. Detecting the orientation of the client device 102 can be utilized for various purposes, such as for determining how to present media content and/or what media content to be present on the different display devices 114 of the client device 102.

The partially open position 212 enables different usage scenarios. For instance, in the partially open position 212 the second housing 204 can be placed on a surface such as a desk or a table to enable media content to be displayed on the display device 114a for user consumption. The client device 102 further includes audio devices 116a that provide audio output such as part of output of media content by the client device 102 and an audio sensor 126a that is operable to detect audible input, such speech input from a user of the client device 102. In at least one implementation the audio devices 116a are configured to output audio content correlated with video content output by the display device 114a.

Figure 2B:
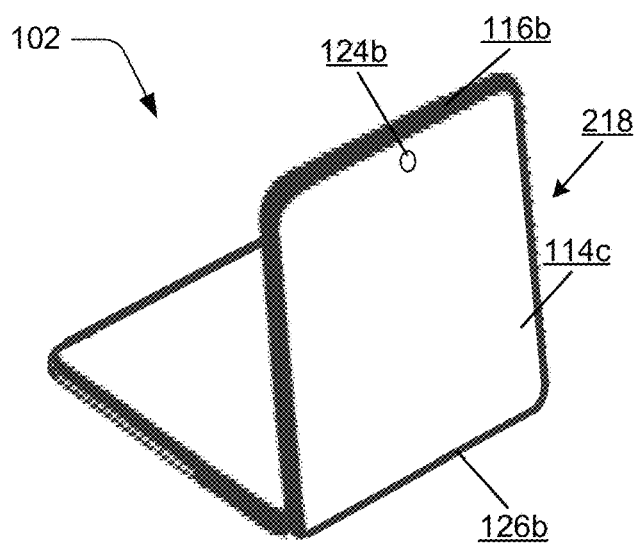
FIG. 2b illustrates further features of a client device in accordance with one or more implementations.

FIG. 2b illustrates further features of the client device 102 in accordance with one or more implementations. The view depicted in FIG. 2b, for instance, represents a rear-facing view of the client device 102, such as in the partially open position 212. In this view a rear surface 218 of the first housing 202 is illustrated, and the rear surface 218 includes a display device 114c. Further, the rear surface 218 includes a camera 124b positioned on the rear surface 218 of the first housing 202. The camera 124b is positionable in various ways, such as within the perimeter of the display device 114c and/or underneath the display device 114c. Alternatively or additionally, the camera 124b is positionable adjacent the display device 114c. The client device 102 further includes audio devices 116b and an audio sensor 126b. The audio devices 116b, for instance, provide audio output, such as part of output of media content by the client device 102 via the display device 114c. The audio sensor 126b is operable to detect audible input, such speech input from a user of the client device 102. In at least one implementation the audio devices 116b are configured to output audio content correlated with video content output by the display device 114c.

Having discussed an example environment and device in which the disclosed techniques can be performed, consider now some example scenarios and implementation details for implementing the disclosed techniques.

Figure 3A:
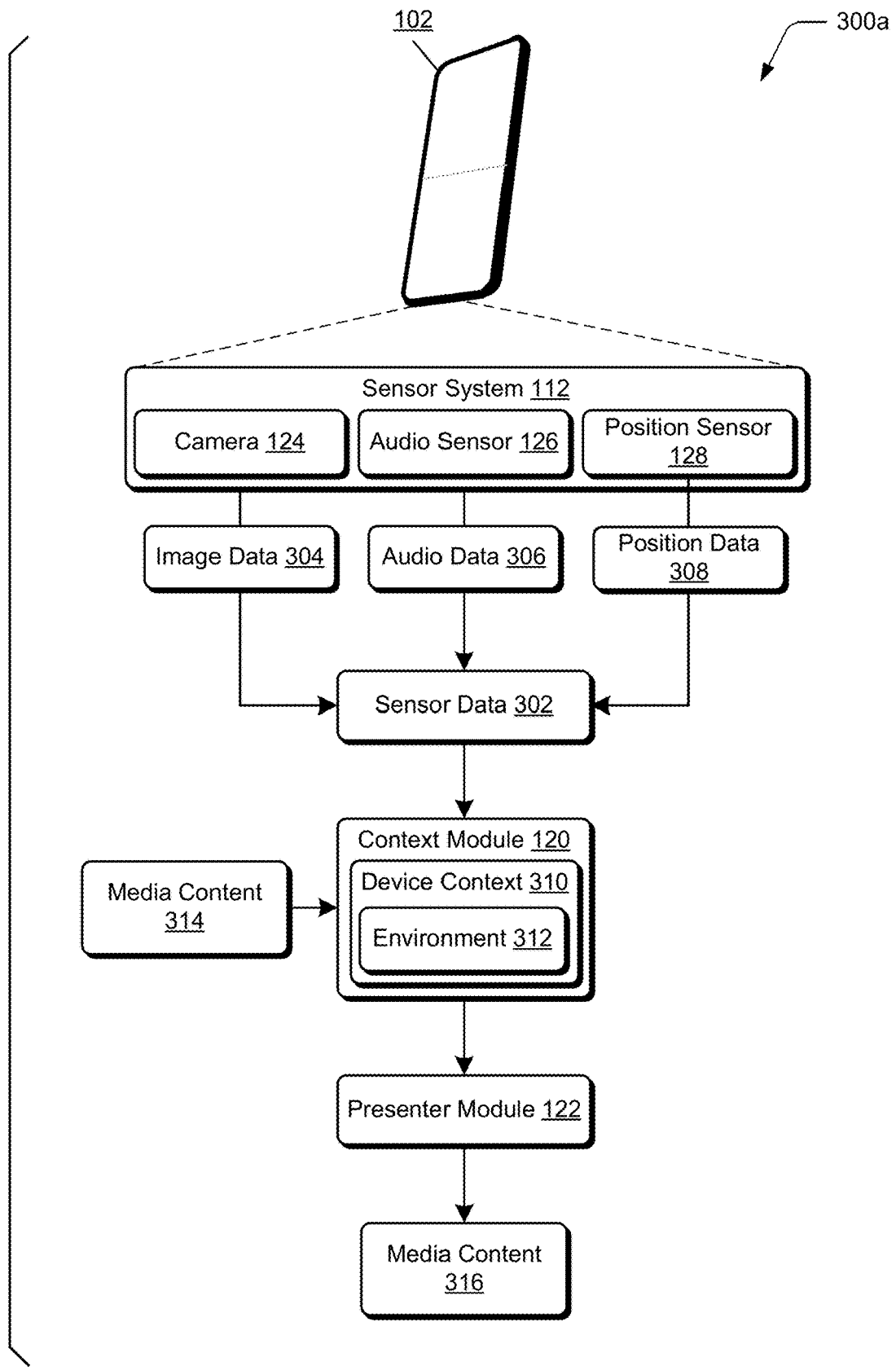
FIG. 3a depicts an example system for implementing aspects of context-based display of content on a multi-display system in accordance with one or more implementations.

FIG. 3a depicts an example system 300a for implementing aspects of context-based display of content on a multi-display system in accordance with one or more implementations. The system 300a can be implemented in the environment 100 and incorporates features and attributes of the environment 100 introduced above.

In the system 300a the sensor system 112 captures sensor data 302 that includes various state information pertaining to the client device 102. For instance, a camera 124 captures image data 304 of a visual environment in proximity to the client device 102 and an audio sensor 126 captures audio data 306 from an audial environment in proximity to the client device 102. Further, a position sensor 128 captures position data 308 (e.g., GPS and/or other position-related data) indicating a position of the client device 102. The context module 120 receives the sensor data 302 and determines device context 310 based on the sensor data 302. The device context 310 can include various types of context data such as device location, device position, time of day, device motion, objects detected in proximity to the client device 102, and so forth. The device context 310, for instance, indicates that the client device 102 is positioned within an environment 312. The environment 312, for instance, represents a particular geographic location.

Further to the system 300a, the context module 120 also determines the device context 310 based on media content 314 output by the client device 102. Accordingly, based on the device context 310 indicating that the client device 102 is located in the environment 312 and that the media content 314 is output by the client device 102, the presenter module 122 generates media content 316 and outputs the media content via the client device 102. The media content 316, for instance, represents a modified version of the media content 314 and/or a different instance and/or type of media content. The media content 316 can be output in various ways, such as visually via a display device 114, audibly via an audio device 116, and so forth.

Figure 3B:
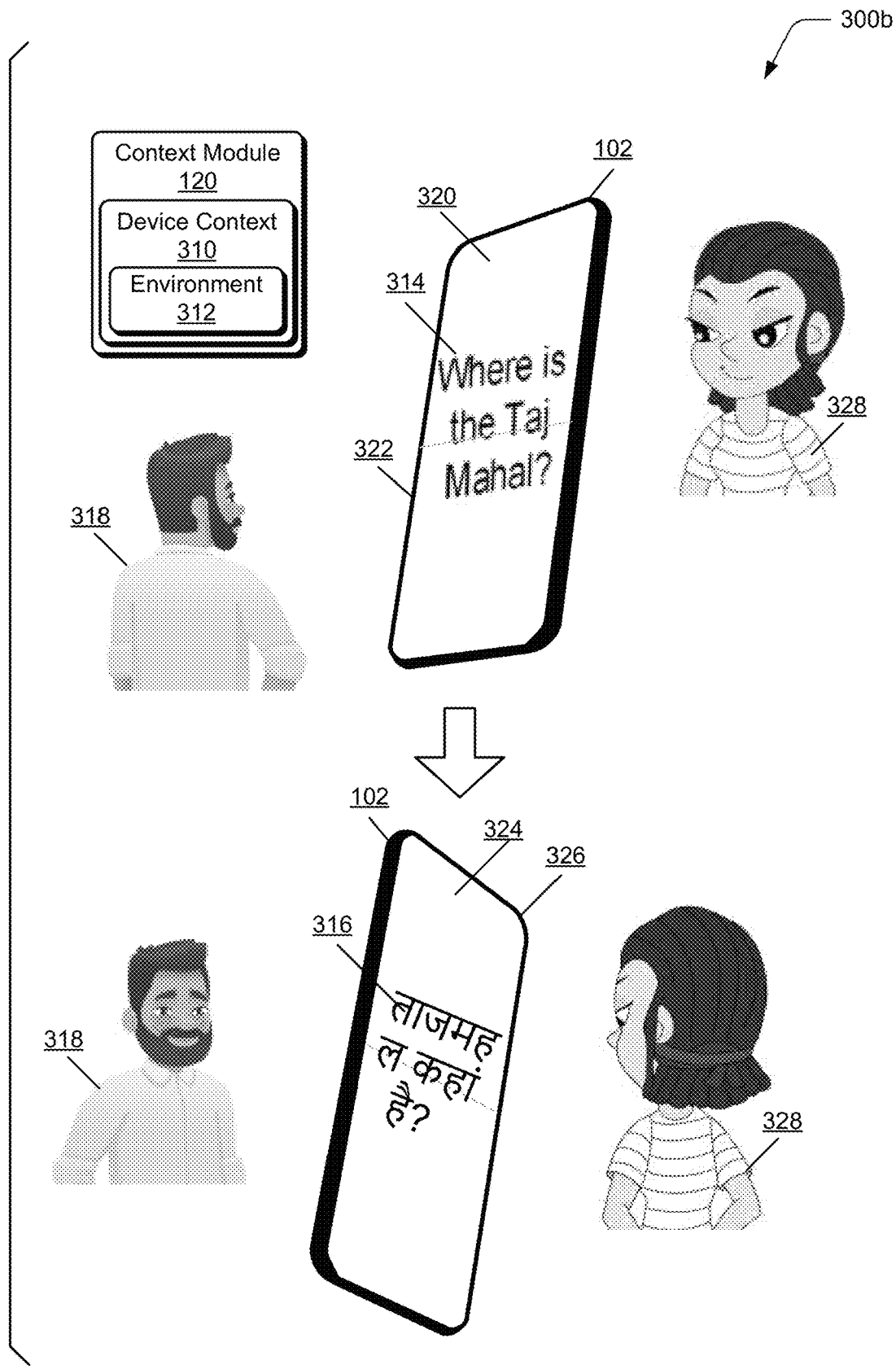
FIG. 3b depicts an example system for implementing aspects of context-based display of content on a multi-display system in accordance with one or more implementations.

FIG. 3b depicts an example system 300b for implementing aspects of context-based display of content on a multi-display system in accordance with one or more implementations. The system 300b can be implemented in the environment 100 and incorporates features and attributes of the environment 100 introduced above. Further, the system 300a can be utilized to implement the system 300b.

In the system 300b, the client device 102 is in possession of a user 318 and the context module 120 of the client device 102 determines the device context 310, such as described above. The context module 120, for instance, determines the device context 310 based on sensor data received from the sensor system 112. In the system 300b the device context 310 indicates that the client device 102 is positioned in the environment 312, which in this particular example represents a geographical location indicating that the client device 102 is positioned at a particular location in India.

Further to the system 300b, the user 318 interacts with the client device 102 to input the media content 314. The media content 314, for instance, represents a text phrase that is input such as via interaction with an application 118. Further, the media content 314 is displayed on a display device 320 positioned at a first surface 322 of the client device 102. The display device 320, for instance, represents an instance of the display devices 114. For example, the display device 320 represents the display devices 114a, 114b with the client device 102 in the fully open position 214. In this particular example the media content 314 includes the phrase "Where is the Taj Mahal?" which is output on the display device 320 in English, which represents a default language of the client device 102, e.g., a language spoken by the user 318.

Based on the environment 312 indicating that the client device 102 is located at a particular location in India, the client device 102 generates a translation of the input phrase into a local language. Here, because the device context 310 and the environment 312 indicate that the client device 102 is located at a particular location in India, the client device 102 translates the phrase "Where is the Taj Mahal?" into Hindi, which can be indicated as translation language for the particular location in India for the client device 102. Accordingly, the translated phrase in Hindi is output as the media content 316 via a second display device 324 positioned at a second surface 326 of the client device 102. In this example, the second display device 324 is positioned on the opposite side of the client device 102 from the display device 320. Thus, a person 328 who is positioned to view the second display device 324 can view the translated phrase on the second display device 324. The person 328, for example, may understand the translated phrase as displayed via the media content 316 and interact with the user 318 accordingly, such as to provide directions to the Taj Mahal.

The media content 316 may be output in various ways, such as based on a style of the media content 314. Style may include, but is not limited to, font, size, color, layout, theme, graphics, images, filters, animations, and so forth. For instance, if the media content 314 depicts a phrase in English in bold blue text, the media content 316 may be based on the media content 314 and depict a translation of the phrase to Hindi in similar bold blue text. Additionally or alternatively, the style of the media content 316 may be different from the style of the media content 314. For instance, an output style of the media content 316 can be adapted to a media type of the media content 316, such as to assist in visibility of the media content 316.

In at least one implementation output of the media content 316 is based on a user-specified preference. For instance, in the system 300b, the user 318 inputs a preference to translate input text to Hindi. The client device 102 (e.g., via an instance of an application 118), for example, provides the user 318 with selectable option to translate text input to the client device 102 into a different language and for display on the display device 324. In at least one implementation, the context module 120 can provide different selectable language options for specific translation languages, and/or an option to automatically detect a local language at a particular location for use in translation.

In at least one implementation, the user 318 may change the media content 316 to be output via the first display device 324. For instance, the user 318 learns that the person 328 does not actually speak Hindi. The user 318 may make a subsequent input to the client device 102 indicating an instruction to translate to a different language, and in response to media content 316 is translated to the different language and displayed on the display device 324.

Thus, context-based display of content on a multi-display system enables the two persons to effectively communicate without the need to be in close proximity. In this example, logic executed by the hardware of the client device 102 (e.g., an application 118, the presenter module 122, etc.) performs translation functionality, but this is not to be construed as limiting, and implementations for applying context-based display of content on a multi-display system can be utilized to determine a variety of different content for presentation based on different device contexts. Further, other types of media may additionally or alternatively be output by the client device 102 based on device context, such as audio content, haptic content, etc.

According to various implementations, to determine the device context 310 of the client device 102, the context module 120 uses the sensor system 112 and/or other components to collect data to determine different device context factors, such as the environment 312 in which the client device 102 is located. Further, the context module 120 may determine the device context 310 in real time such as to detect changes in the device context 310. If the context module 120 detects a change in the device context 310 (e.g., a change in the environment 312), the media content 316 may be updated and/or changed to reflect the change in environment 312.

While implementations are discussed herein with reference to the client device 102 in the fully open position 214 such that the device is in a planar or semi-planar orientation, it is to be appreciated that the described techniques can be applied with the client device 102 in a variety of different orientations. For instance, the client device 102 can be positioned in the partially open position 212.

Figure 3C:
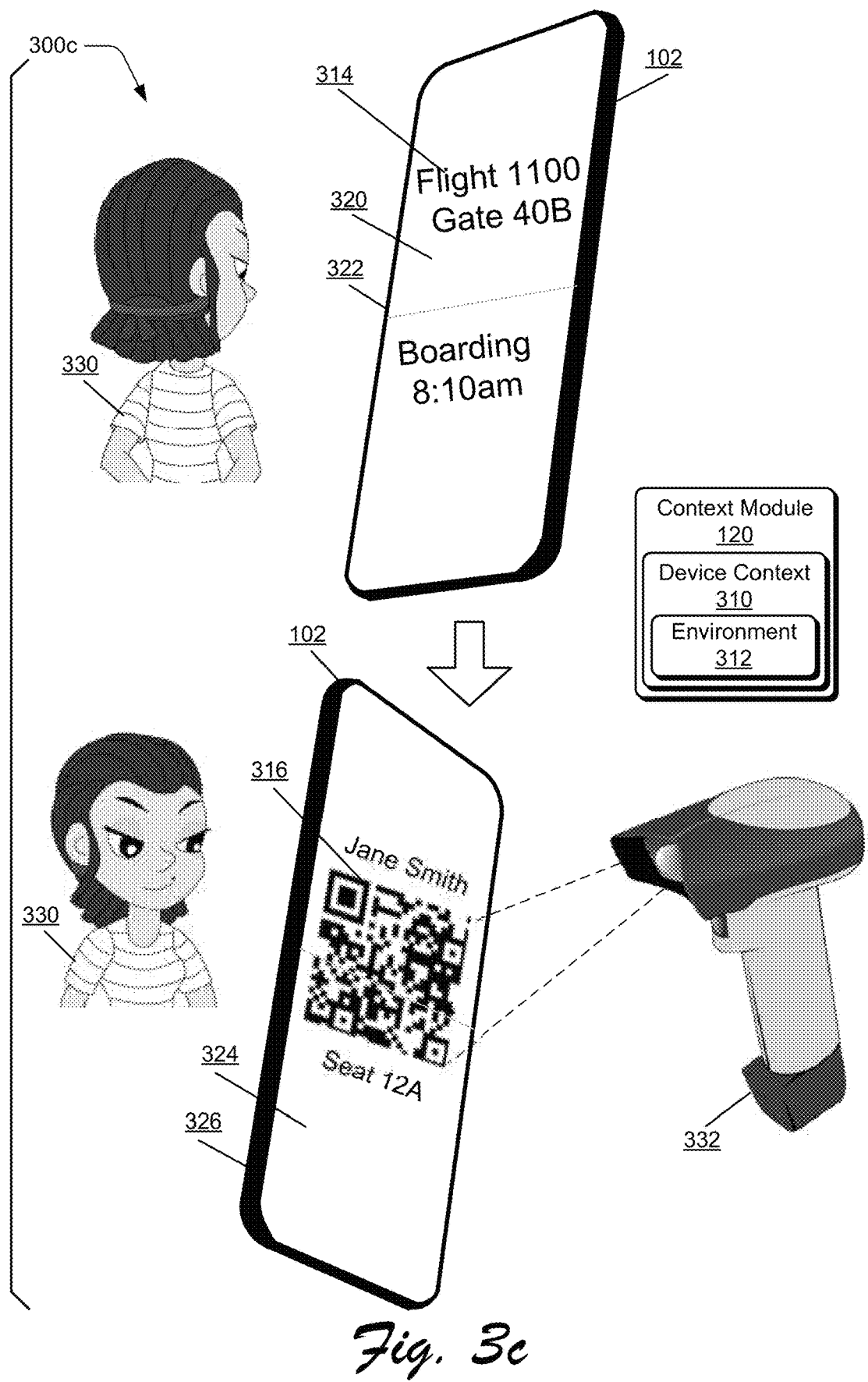
FIG. 3c depicts an example system for implementing aspects of context-based display of content on a multi-display system in accordance with one or more implementations.

FIG. 3c depicts an example system 300c for implementing aspects of context-based display of content on a multi-display system in accordance with one or more implementations. The system 300c can be implemented in the environment 100 and incorporates features and attributes of the environment 100 introduced above. Further, the system 300a can be utilized to implement the system 300c.

In the system 300c the client device 102 is in possession of a user 330 and the context module 120 determines the device context 310 including that the client device 102 is located in the environment 312. In this particular example, the environment 312 indicates that the client device 102 is located within an airport, such as at a departure gate in an airport. Further, media content 314 is displayed on the display device 320 at the first surface 322 of the client device 102. In this particular example the media content 314 includes flight-related content for the user 330, such as flight number, gate number, boarding time, etc. Accordingly, based on the device context 310 indicating that the environment 312 is a flight-related location (e.g., an airport) and that the media content 314 represents flight information, the presenter module 122 generates the media content 316 to include further flight-related information and causes the media content 316 to be displayed on the display device 324 at the second surface 326 of the client device 102. In at least one implementation the media content 316 includes different flight-related information than the media content 314. The media content 316, for instance, includes boarding information that enables the user 330 to board a flight, such as a scannable optical code with flight information, the user's name, a seat assignment, and so forth. In at least one implementation the media content 316 includes information that is not included in the media content 314, or includes at least some overlapping information with the media content 314.

Further to the system 300c, flight personnel can view the media content 316 and allow the user 330 to board a flight. For instance, a scanner device 332 can scan the optical code included as part of the media content 316 to indicate permission for the user 330 to board a flight.

Thus, context-based display of content on a multi-display system allows the user 330 to effectively communicate with another entity without the need to be in close proximity. This also provides an effective communication method that prevents crowding of information on the display device 320, such as by presenting information that is pertinent to the user 330. Similarly, this also prevents crowding of information on the display device 324 by presenting media content 316 that is pertinent to an entity that is positioned to view the display device 324. In this example, an application 118 executed by the hardware of the client device 102 performs functions related to collecting the user's flight information for display, but implementations for applying context-based display of content on a multi-display system are not limited. Alternatively or additionally, the media content 316 can include other types of media such as audio content, image content, video content, or other forms of media.

While implementations are discussed herein with reference to the client device 102 in the fully open position 214 such that the device is in a planar or semi-planar orientation, and placed on a dock or other device holding apparatus in a vertical orientation such that the display device 320 and the display device 324 are viewable from different respective orientations, it is to be appreciated that the described techniques can be applied with the client device 102 in a variety of different orientations. For instance, the client device 102 can be opened to the partially open position 212.

Figure 4:
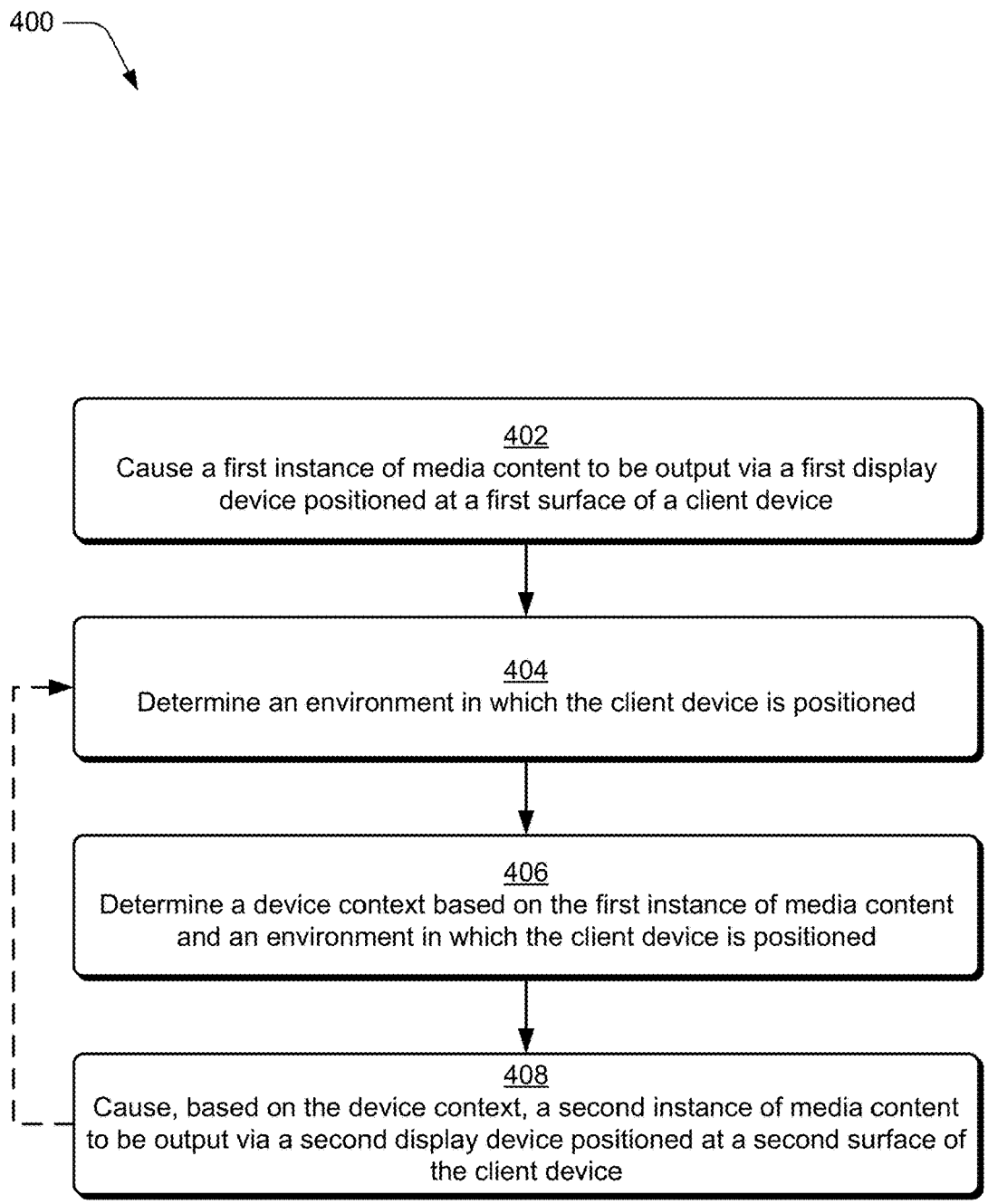
FIG. 4 illustrates a flow chart depicting an example method that supports context-based display of content on a multi-display system in accordance with one or more implementations.

FIG. 4 illustrates a flow chart depicting an example method 400 that supports context-based display of content on a multi-display system in accordance with one or more implementations. The method 400, for example, can be implemented in the context of the environment 100. At 402 a first instance of media content is caused to be output via a first display device positioned at a first surface of a client device. For example, the media content 314 is output via a display device 114 of the client device 102. The media content 314 can be generated in various ways, such as via user input to generate the media content 314, user selection of the media content 314 via the client device 102, and so forth.

At 404 an environment in which the client device is positioned is determined. The sensor system 112, for example, utilizes one or more position sensors 128 to determine a position of the client device 102. The position can be determined in various ways, such as a geographical position (e.g., position coordinates, a location name, and so forth), a device orientation (e.g., in a 3-dimensional space), and so forth.

At 406 a device context is determined based on the first instance of media content and the environment in which the client device is positioned. The context module 120, for example, determines the device context based an instance of media being output by a display device 114 of the client device 102, and an environment (e.g., geographical location) of the client device 102. The device context can additionally or alternatively include other context attributes such as time of day, date, a presence of a person, presence of an identified object, etc.

At 408, based on the device context, a second instance of media content is caused to be output via a second display device positioned at a second surface of the client device. For example, based on the device context 310, the presenter module 122 causes the media content 316 to be output via a second display device 114 of the client device. The media content 316 can be implemented in various ways, such as a modification of the media content 314 based on the device context 310, additional content that is contextually related to the media content 314, and so forth.

In at least one implementation, the device context includes one or more attributes of a geographical location of the client device (e.g., a language for the geographical location), and the second instance of media content is generated by modifying the first instance of media content by modifying the first instance of media content based on the one or more attributes. For instance, the presenter module 122 translates the first instance of media content into a language for a detected geographic location to generate the second instance of media content.

According to various implementations, the method 400 is performable dynamically based on changes in device context. For instance, if the first instance of media content being output by the first display device changes (e.g., based on user interaction) and/or the environment in which the client device 102 is positioned changes, the device context can change and thus cause a change in the second instance of media content output by the second display device.

Figure 5:
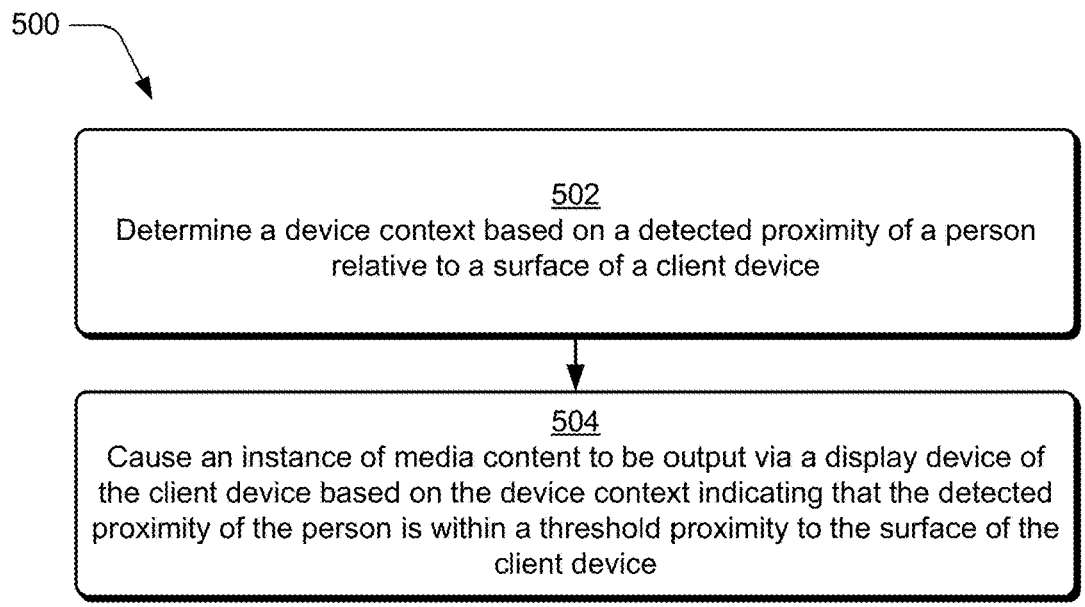
FIG. 5 illustrates a flow chart depicting an example method that supports context-based display of content on a multi-display system in accordance with one or more implementations.

FIG. 5 illustrates a flow chart depicting an example method 500 that supports context-based display of content on a multi-display system in accordance with one or more implementations. The method 500, for example, can be implemented in the context of the environment 100 and/or the method 400.

At 502 a device context is determined based on a detected proximity of a person relative to a surface of a client device. For instance, the detection module 132 detects a person other than a user of the client device 102 within a particular proximity to a surface of the client device. In at least one implementation the proximity of the person is determined based on image data captured by a camera 124 of the client device 102, such as the camera 124b positioned at the rear surface 218 of the client device 102.

At 504 an instance of media content is caused to be output via a display device of the client device based on the device context indicating that the detected proximity of the person is within a threshold proximity to the surface of the client device. The presenter module 122, for example, causes an instance of media content to be output via a display device 114 of the client device 102 based on determining that the person other than the user of the client device is detected within a threshold proximity to the client device 102, e.g., the rear surface 218 of the client device 102. Proximity to the client device and/or the threshold proximity are definable in various ways, such as in meters, feet, and/or other suitable distance unit. Further, in at least some implementations, the threshold proximity is user configurable and/or is dynamically configurable, such as based on changes in location of the client device 102.

Figure 6:
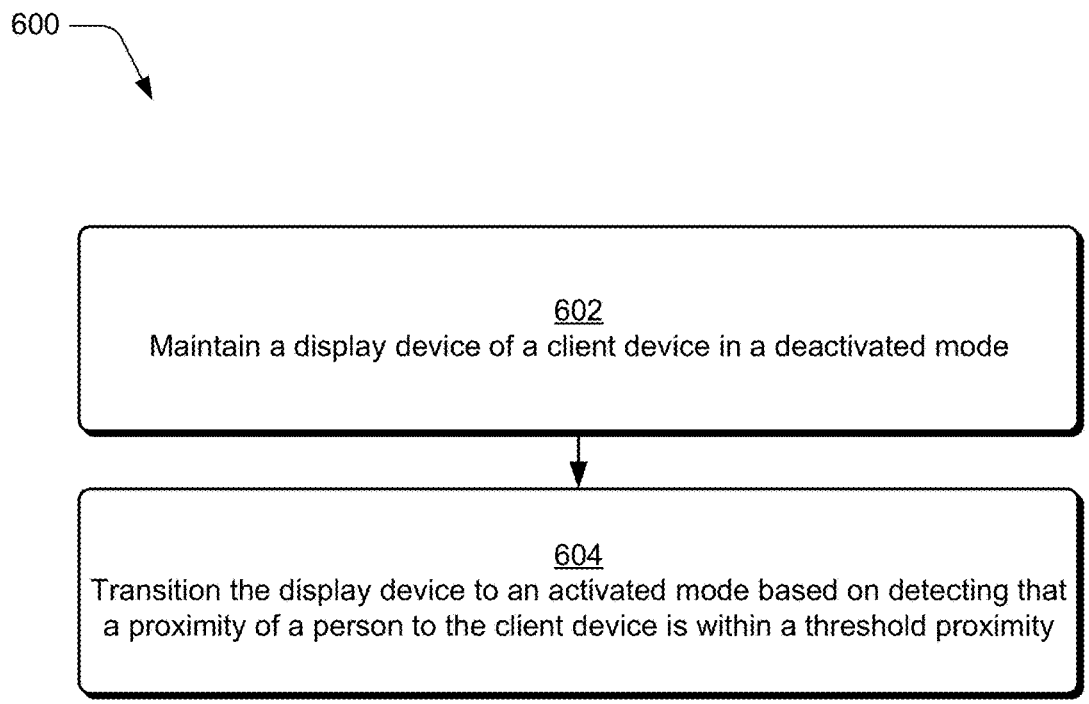
FIG. 6 illustrates a flow chart depicting an example method that supports context-based display of content on a multi-display system in accordance with one or more implementations.

FIG. 6 illustrates a flow chart depicting an example method 600 that supports context-based display of content on a multi-display system in accordance with one or more implementations. The method 600, for example, can be implemented in the context of the environment 100 and/or the methods 400, 500.

At 602 a display device of a client device is maintained in a deactivated mode. For instance, the client device 102 maintains a particular display device 114 (and/or set of display devices 114) in a deactivated mode, such as a low-power and/or powered off mode. In an example implementation, the display device 114a and/or display device 114b are operated in an activated mode (e.g., powered on mode) while a user is interacting with the client device 102, and the display device 114c is maintained in the deactivated mode.

At 604 the display device is transitioned to an activated mode based on detecting that a proximity of a person to the client device is within a threshold proximity. The detection module 132, for instance, detects a person other than a user of the client device 102 within a particular proximity to a surface of the client device 102, such as relative to the display device 114c. Accordingly, the client device 102 can activate the display device 114c, such as to transition the display device 114c from a power-off and/or low power mode to a power on mode. The presenter module 122 can then cause an instance of media content to be output via a display device 114c, such as based on determining that the person other than the user of the client device is detected within a threshold proximity to the client device 102, e.g., the rear surface 218 of the client device 102.

FIGS. 7a-7d depict example systems that support alert based on distance in a multi-display system in accordance with one or more implementations. The example systems utilize sensor data captured via the client device 102 and in at least one implementation are implemented in the context of the environment 100 and/or the system 300a. For instance, the sensor data 302 generated in the system 300a can be utilized in conjunction with the systems discussed in FIGS. 7a-7d.

Figure 7A:
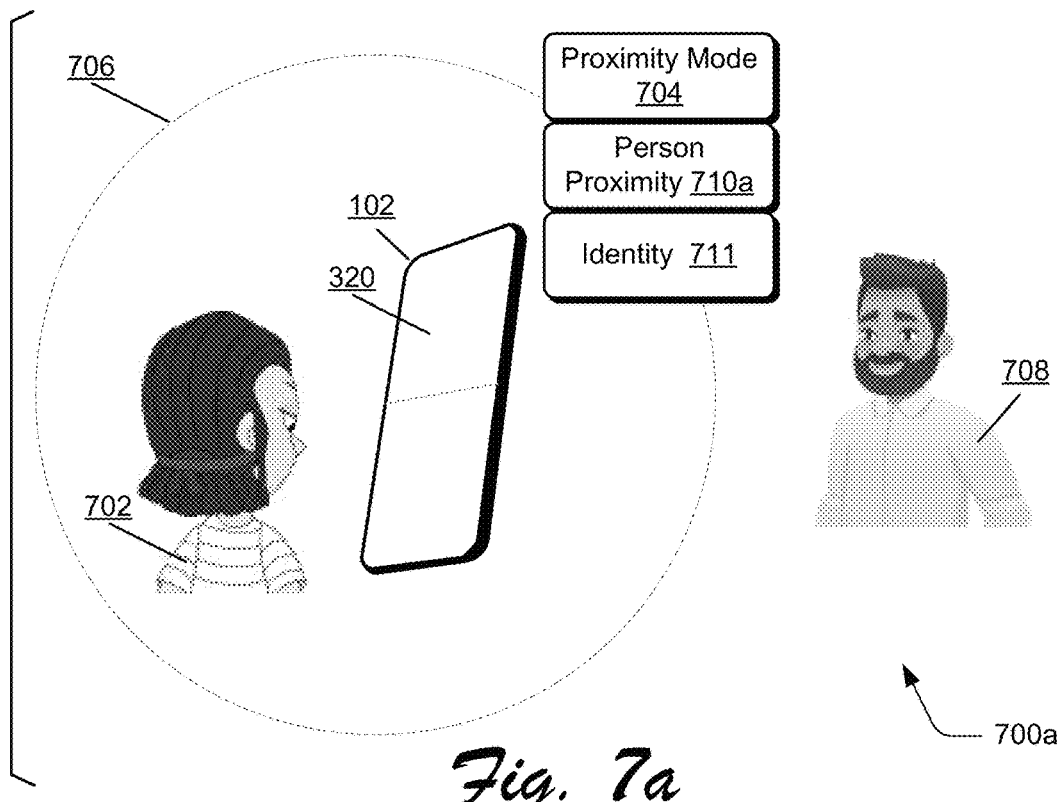
FIG. 7a depicts an example system for implementing alert based on distance in a multi-display system in accordance with one or more implementations.

FIG. 7a depicts an example system 700a for implementing alert based on distance in a multi-display system in accordance with one or more implementations. The system 700a can be implemented in the environment 100 and incorporates features and attributes of the environment 100 introduced above. In the system 700a a user 702 is in possession of the client device 102 and a proximity mode 704 is active on the client device 102. In the proximity mode 704, for instance, the client device 102 monitors sensor data (e.g., the sensor data 302) from the sensor system 112 to determine whether a person other than the user 702 is detected in proximity to the client device 102, and if so, a proximity of the person. Further, as part of the proximity mode 704, a proximity zone 706 is defined relative to the client device 102.

The proximity zone 706, for instance, represents a threshold distance from the client device 102. The proximity zone 706 is definable in various ways, such as based on a default distance value for the proximity mode 704, a user-specified distance value, a distance value specified for different environments (e.g., locations), and so forth. For instance, some locations may be defined as untrusted locations and trusted locations. When the client device 102 is detected at an untrusted location the proximity mode 704 can be activated, and when the client device 102 is detected at a trusted location the proximity mode 704 can be deactivated and/or modified. Further, some locations inherently involve close proximity of persons to one another (e.g., public transportation, an airplane, a vehicle, and so forth), and thus when a user is detected in a close proximity location, the proximity mode 704 can be deactivated, e.g., temporarily until the user leaves the close proximity location.

Further to the system 700a and according to the proximity mode 704, the client device 102 detects a person 708 in proximity to the client device 102. The sensor data 302, for example, detects the person 708 as a person other than the user 702 in proximity to the client device 102. Further, the sensor data 302 indicates a person proximity 710a of the person 708, e.g., a distance of the person 708 from the client device 102. In this particular example the person proximity 710a indicates that the person 708 is detected outside of the proximity zone 706. Further, as part of detecting the person 708, the client device 102 utilizes the sensor data 302 to attempt to determine an identity 711 of the person 708. The detection module 132, for example, attempts to match physical attributes of the person 708 to known physical attributes of known persons for the user 702, e.g., contacts of the user 702 that are registered with the client device 102.

According to various implementations, the detection module 132 can utilize sensor data 302 that describes various physical attributes to attempt to identify the person 708, such as facial features, voice recognition, body type recognition, gait recognition, and so forth. Thus, if the detection module 132 determines that the person 708 matches a known user, the client device 102 determines that the person 708 is known to the user 702, e.g., a trusted person. However, if the detection module 132 determines that the person 708 does not match a known person, the client device 102 determines that the person 708 is not known to the user 702, e.g., is an untrusted person. Thus, the identity 711 indicates whether the person 708 is known (e.g., trusted) or unknown, e.g., untrusted. In at least some implementations, the proximity mode 704 ignores presence of known persons within the proximity zone 706, but enforces the proximity zone 706 for unknown persons.

Figure 7B:
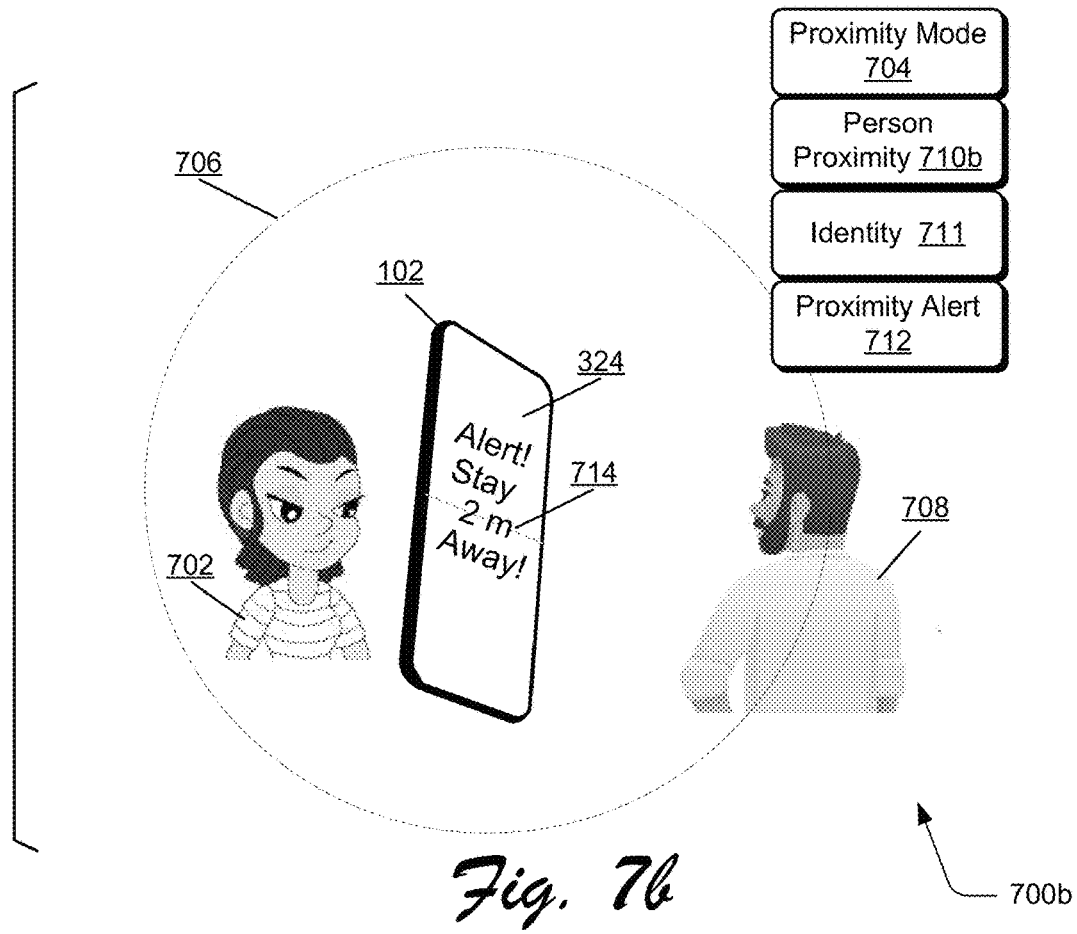
FIG. 7b depicts an example system for implementing alert based on distance in a multi-display system in accordance with one or more implementations.

FIG. 7b depicts an example system 700b for implementing alert based on distance in a multi-display system in accordance with one or more implementations. The system 700b can be implemented in the environment 100 and incorporates features and attributes of the environment 100 introduced above. The system 700b, for instance, represents an extension and/or continuation of the system 700a.

In the system 700b the proximity mode 704 is active on the client device 102 and the client device 102 continues to monitor proximity of persons other than the user 702 to the client device 102. The client device 102, for instance, determines a person proximity 710b of the person 708 to the client device 102 and based on the person proximity 710b, that the person 708 is within the proximity zone 706. Further, the client device 102 determines based on the identity 711 that the person 708 is an unknown person. For example, based on detecting the person 708 within the proximity zone 706 (e.g., within a threshold proximity distance to the client device 102) and that the identity 711 indicates that the person 708 is an unknown person, the client device 102 generates and outputs a proximity alert 712. The proximity alert 712, for instance, includes a visual alert 714 that is displayed on the display device 324 of the client device 102. The display device 324, for instance, represents an instance of the display devices 114 that is opposite a position of the user 702 and that is viewable by the person 708. Additionally or alternatively to the visual alert 714, the proximity alert 712 can include other types of alerts, such as an audible alert output by the client device 102. The proximity alert 712, for instance, indicates that the person 708 is too close to the client device 102 and/or requests that the person 708 move away from the client device 102, e.g., outside of the proximity zone 706.

In at least one implementation, the proximity alert 712 may be based on an input from the user 702. For instance, the user 702 may choose a visual alert, such as text reciting "Alert! Stay 6 ft. away" for output by the client device 102 or an audible alert output by an audio device 116 on the client device 102 saying "Alert! Stay six feet away."

In at least one implementation the proximity alert 712 may be a variable alert output based on a variable-configured threshold distance. For example, the user 702 may specify a predetermined inner-threshold at 3 ft. and a predetermined outer-threshold at 10 ft. When the person 708 moves inside the outer-threshold and is detected by the detection module 132, a predetermined alert, such as a visual alert, may be output. When the person 708 moves inside the inner-threshold and is detected by the detection module 132, a different predetermined alert, such as an audible alert, may be output.

According to various implementations the detection module 132 receives sensor data 302 in real time and dynamically updates a position status of the person 708 relative to the client device 102. For instance, when the position of the person 708 changes relative to the client device 102 (e.g., based on movement of the user 702, the client device 102, and/or the person 708), the detection module 132 updates to identify the change in position of the person 708 relative to the client device 102.

Figure 7C:
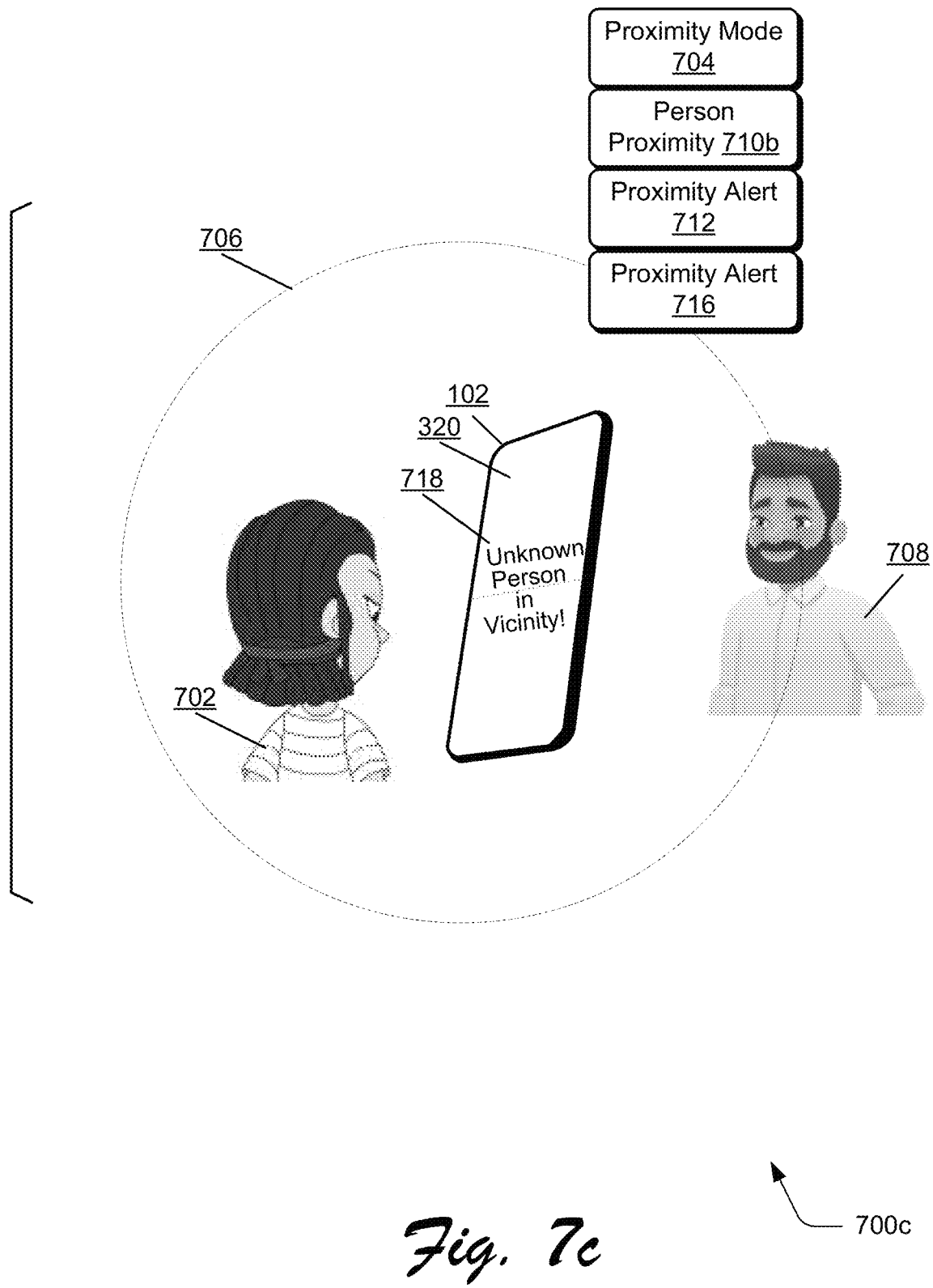
FIG. 7c depicts an example system for implementing alert based on distance in a multi-display system in accordance with one or more implementations.

FIG. 7c depicts an example system 700c for implementing alert based on distance in a multi-display system in accordance with one or more implementations. The system 700c can be implemented in the environment 100 and incorporates features and attributes of the environment 100 introduced above. The system 700c, for instance, represents an extension and/or continuation of the systems 700a, 700b.

In the system 700c and while the proximity mode 704 is active and the person proximity 710b indicates that the person 708 is within the proximity zone 706 (e.g., within a threshold proximity distance to the client device 102), the client device 102 generates and outputs a proximity alert 716. The proximity alert 716, for instance, includes a visual alert 718 that is displayed on the display device 320 of the client device 102. The visual alert 718, for example, alerts the user 702 that the person 708 is detected within a threshold proximity to the client device 102. In at least one implementation, the display device 320 represents an instance of the display devices 114 that is in view of (e.g., facing) the user 702. Additionally or alternatively to the visual alert 714, the proximity alert 712 can include other types of alerts, such as an audible alert output by the client device 102. In at least one implementation the proximity alert 716 is output concurrently with the proximity alert 712 as described in the system 700b, e.g., while the person 708 is detected within the proximity zone 706.

Figure 7D:
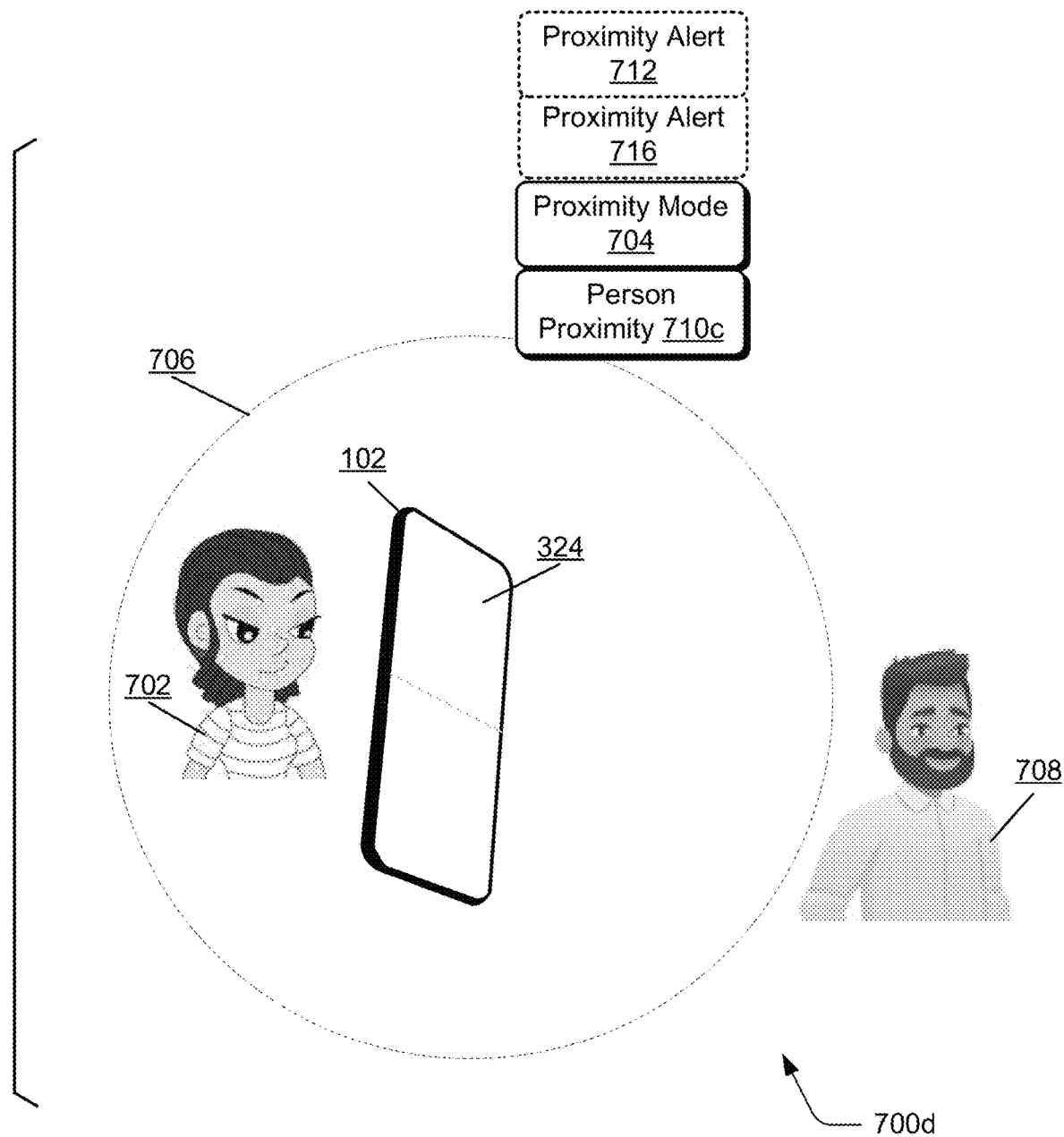
FIG. 7d depicts an example system for implementing alert based on distance in a multi-display system in accordance with one or more implementations.

FIG. 7d depicts an example system 700d for implementing alert based on distance in a multi-display system in accordance with one or more implementations. The system 700d can be implemented in the environment 100 and incorporates features and attributes of the environment 100 introduced above. The system 700d, for instance, represents an extension and/or continuation of the systems 700a-700c.

In the system 700d the proximity mode 704 is active and the client device 102 monitors a person proximity 710c of the person 708 relative to the client device 102. The person proximity 710c, for instance, indicates that the person 708 moves outside of the proximity zone 706. Accordingly, based on detecting that the person proximity 710c is outside of the proximity zone 706, the client device 102 deactivates the proximity alerts 712, 716. The client device 102, for instance, removes the visual alerts 714, 718 from display on the client device 102. The client device 102 remains in the proximity mode 704 and monitors for proximity and identity of persons relative to the client device 102.

Thus, the implementations discussed in the systems 700a-700d are dynamically operable to respond to changes in the position of the person 708 relative to the client device 102 and change alert status accordingly.

In at least some implementations, the systems 300b, 300c described above are combinable with the systems 700a-700d. For instance, with reference to the systems 300b, 300c and while the client device is outputting the media content 316 based on the device context 310, the client device 102 can also be in the proximity mode 704 and monitor for proximity of unknown (e.g., untrusted) persons. For instance, the client device 102 can implement a first proximity threshold for generating and outputting the media content 316 and a second proximity threshold (e.g., a closer proximity to the client device) as part of the proximity mode 704 for monitoring proximity of unknown persons.

Thus, if the client device 102 detects an unknown person within a threshold proximity to the client device 102 while the client device 102 is outputting the media content 316, the client device 102 can output an alert on the display device 324 to alert the unknown person that the person is too close to the client device 102. The alert, for instance, can supplement or replace the media content 316 on the display device 324. Further, the client device 102 can output an alert on the display device 320 to alert the user 318 of the client device 102 that an unknown user is within a threshold proximity to the client device 102. Thus, the various implementations and systems described herein are combinable in different ways to provide a variety of different functional implementation scenarios.

Figure 8:
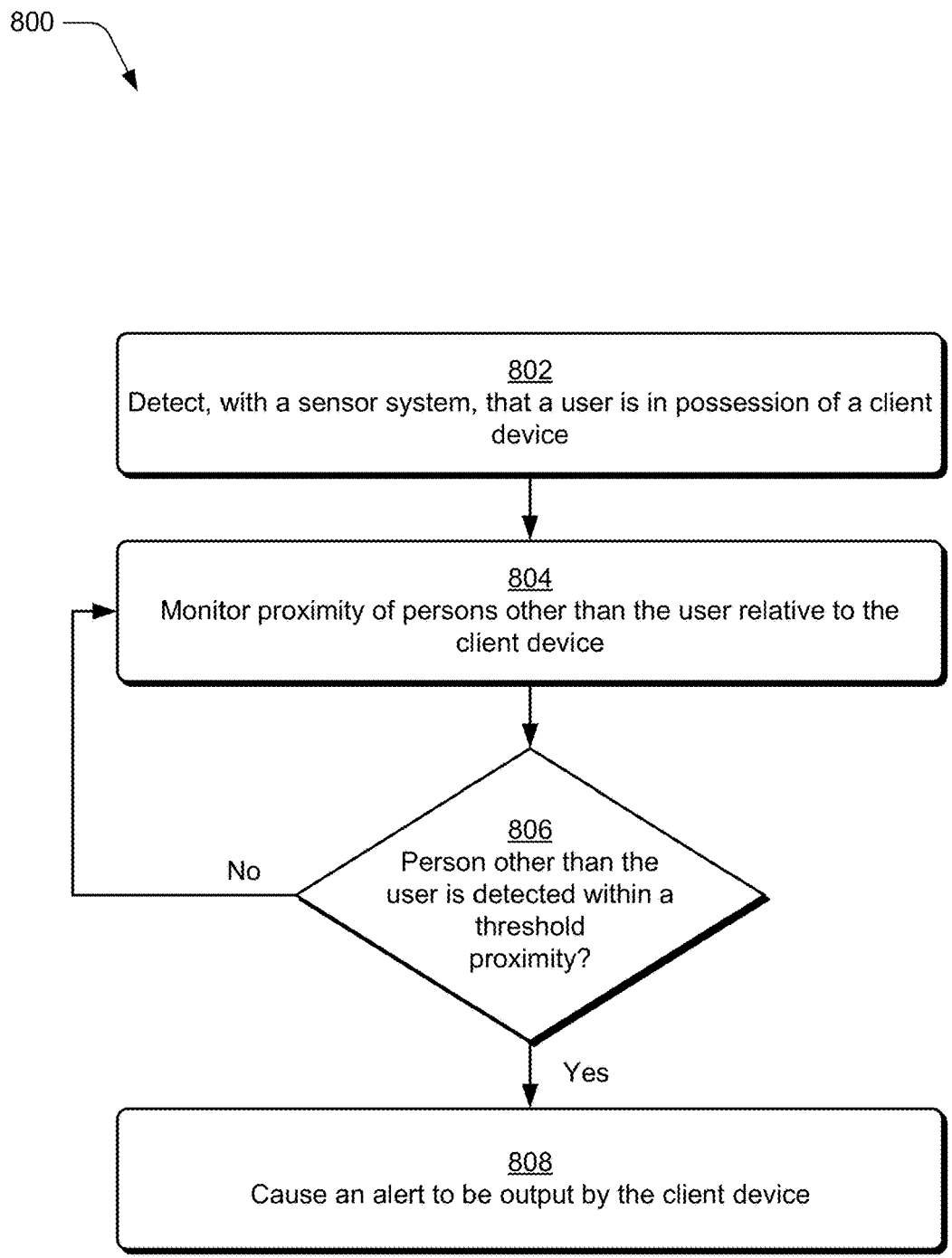
FIG. 8 illustrates a flow chart depicting an example method for alert based on distance in a multi-display system in accordance with one or more implementations.

FIG. 8 illustrates a flow chart depicting an example method 800 for alert based on distance in a multi-display system in accordance with one or more implementations. The method 800, for instance, can be implemented in the context of the environment 100. At 802 it is detected, with a sensor system, that a user is in possession of a client device. For example, the detection module 132 utilizes sensor data from the sensor system 112 to determine that a user is in possession of the client device 102. In at least one implementation the detection module 132 determines that a registered (e.g., authenticated) user is in possession of the client device 102.

At 804 a proximity of persons other than the user relative to the client device is monitored. The detection module 132, for instance, receives sensor data from the sensor system 112 and determines whether a person other than the user is detected in proximity to the client device 102 and if so, a proximity (e.g., distance) of the user to the client device 102. In at least one implementation, proximity of persons other than the user is monitored based on a proximity mode being active on the client device 102.

At 806 it is determined whether person other than the user is detected within a threshold proximity to the client device. For instance, based on a threshold proximity (e.g., the proximity zone 706) and sensor data from the sensor system 112, the detection module 132 determines whether a person other than the user is detected within the threshold proximity. As mentioned above, the threshold proximity is definable in various ways, such as a default proximity for the proximity mode 704, a user-defined threshold proximity, a location-specific threshold proximity (e.g., based on untrusted and/or trusted locations), and so forth.

If at 806 a person other than the user is not detected within the threshold proximity to the client device ("No"), the method returns to 804 and continues to monitor for proximity of persons other than the user to the client device 102. If at 806 a person other than the user is detected within the threshold proximity to the client device ("Yes"), at 808 an alert is caused to be output by the client device. For example, the proximity alert 712 is output by the client device 102.

According to various implementations the method 800 is performable dynamically and can respond to changes in proximity of a person other than the user to the client device 102. For instance, if at 808 a person other than the user is detected within the threshold proximity to the client device 102 and at 806 an alert is output, at 804 the client device 102 continues to monitor proximity the person other than the user to the client device 102. If the person other than the user is subsequently detected as not within the threshold proximity to the client device 102, the client device 102 can stop outputting the alert.

Figure 9:
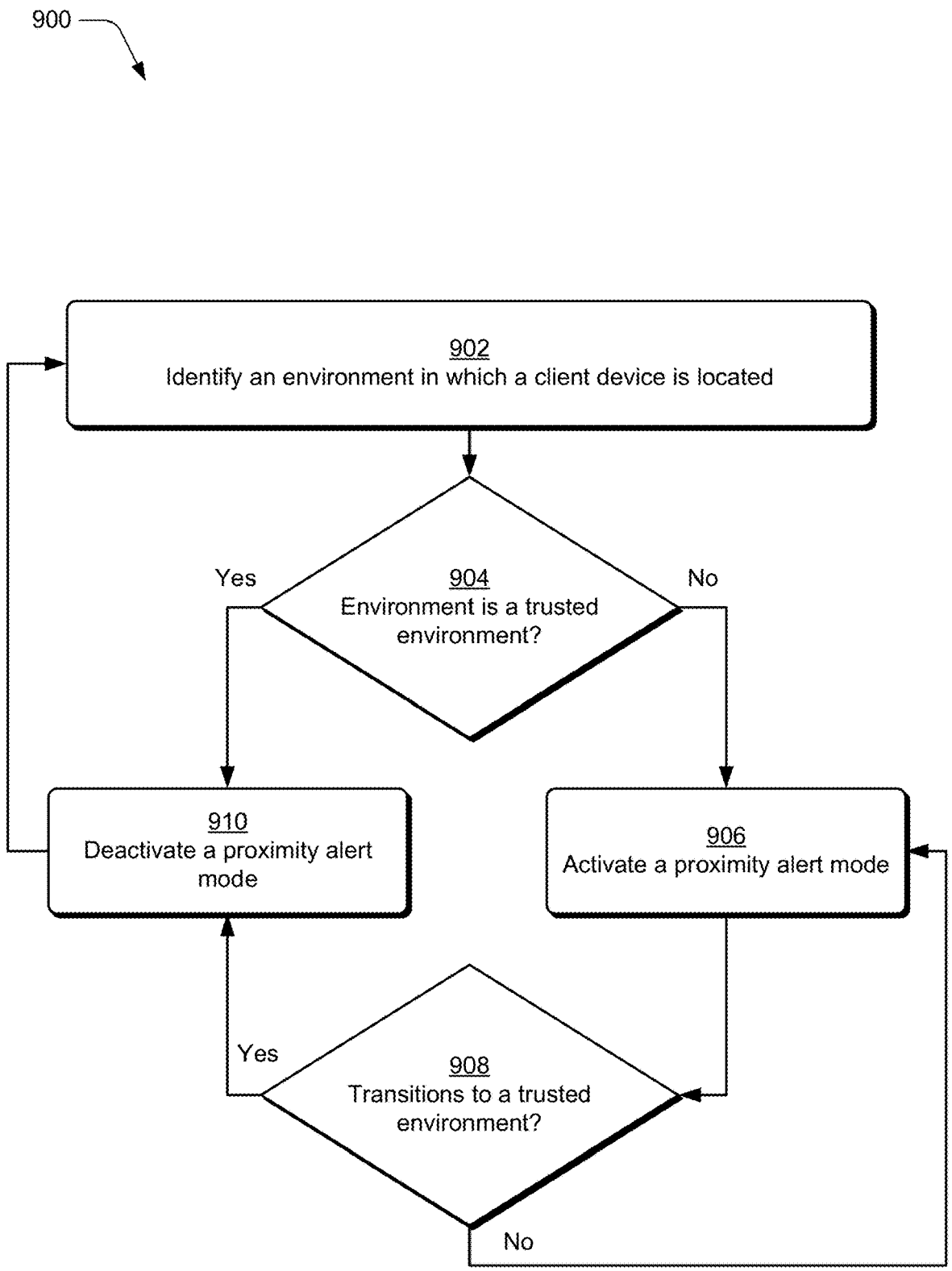
FIG. 9 illustrates a flow chart depicting an example method for alert based on distance in a multi-display system in accordance with one or more implementations.

FIG. 9 illustrates a flow chart depicting an example method 900 for alert based on distance in a multi-display system in accordance with one or more implementations.

The method 900, for instance, can be implemented in the context of the environment 100 and/or represents an extension of the method 800.

At 902 an environment in which a client device is located is identified. The context module 120, for instance, determines based on sensor data from the sensor system 112 an environment in which the client device 102 is located, such as a geographical location. At 904 it is determined whether the environment is a trusted environment. For example, the context module 120 correlates the environment to a database of trusted and/or untrusted environments. Whether an environment is trusted or untrusted, for instance, can be defined in various ways. In at least one example, whether environments are trusted or untrusted can be defined based on location type and/or specific instances of locations. For instance, locations that are generally accessible to any person can be specified as untrusted locations, such as commercial locations, public locations, and so forth. Locations that are subject to restricted access can be specified as trusted locations, such as private locations (e.g., residences), restricted access enterprise locations, and so forth. In at least one implementation, a user of the client device 102 can define specific types and/or instances of locations that are trusted and/or untrusted.

If the identified environment is determined to be trusted ("Yes"), the method returns to 904 and monitors for an environment in which the client device is located. If the identified environment is determined to be untrusted ("No"), at 906 a proximity alert mode is activated. As described previously, for example, in the proximity mode 704 the detection module 132 monitors for proximity of persons other than a user of the client device 102, such as whether such persons are within a threshold proximity to the client device 102. In the proximity alert mode, if a person other than a user of the client device 102 is detected within a threshold proximity to the client device 102, an alert can be output.

Further to the method 900, at 908 it is determined whether the client device transitions to a trusted environment. The detection module 132, for instance, monitors sensor data from the sensor system 112 and determines whether the client device 102 remain in an untrusted environment or moves to an environment that is indicated as a trusted environment. If the client device does not transition to a trusted environment ("No"), the method returns to 906 where the proximity alert mode is activated. If the client device transitions to a trusted environment ("Yes"), at 910 the proximity alert mode is deactivated. The method 900 can return to 902 to identify an environment in which the client device is located to determine whether to activate a proximity alert mode.

Figure 10:
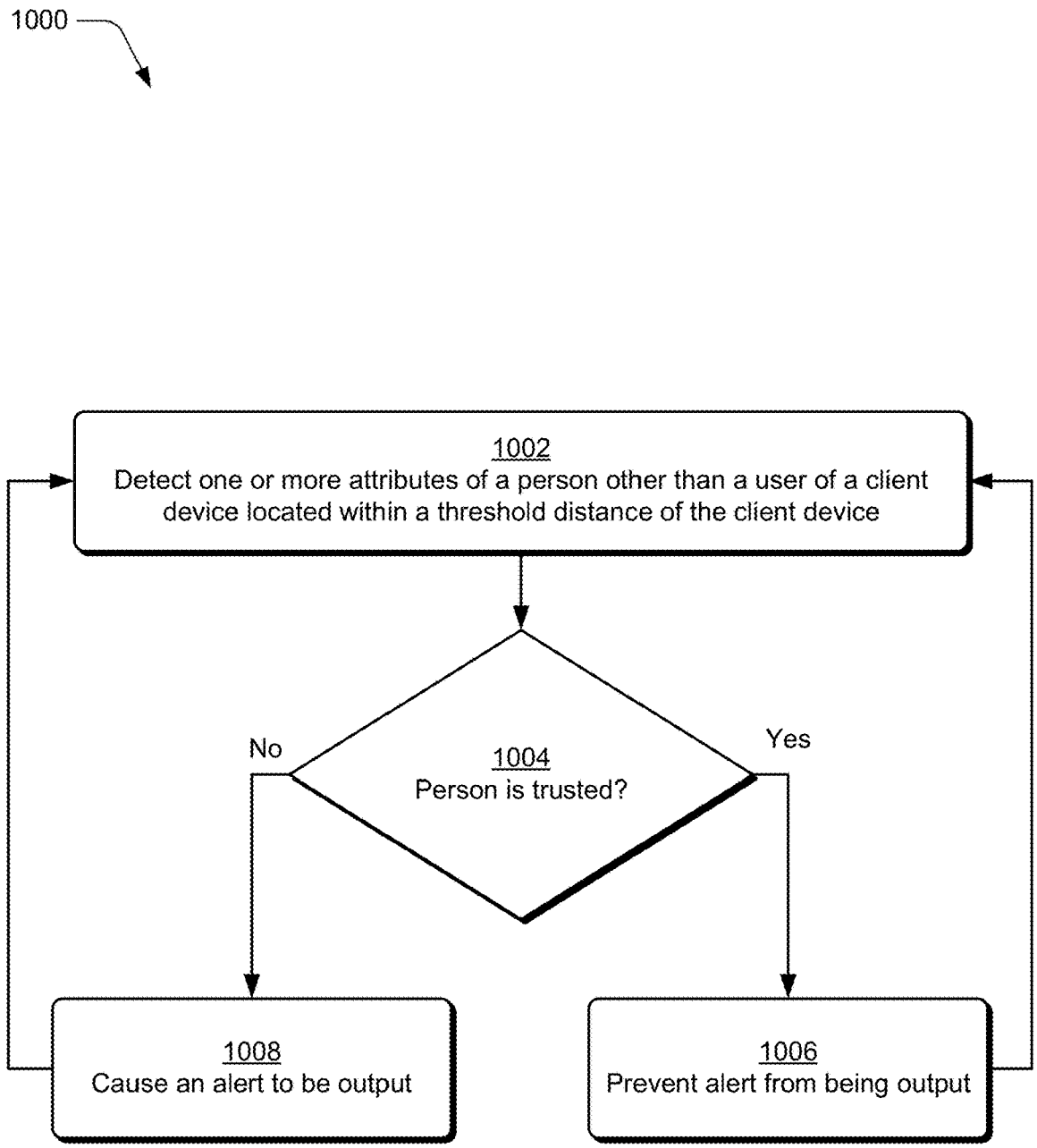
FIG. 10 illustrates a flow chart depicting an example method for alert based on distance in a multi-display system in accordance with one or more implementations.

FIG. 10 illustrates a flow chart depicting an example method 1000 for alert based on distance in a multi-display system in accordance with one or more implementations. The method 1000, for instance, can be implemented in the context of the environment 100 and/or represents an extension of the methods 800, 900. In at least one implementation the method 1000 is performed while the client device 102 is in the proximity alert mode.

At 1002 one or more attributes of a person other than a user of a client device located within a threshold distance of the client device are detected. The context module 120, for instance, determines based on sensor data from the sensor system 112 attributes of a person other than a user of the client device 102 detected within a threshold proximity to the client device 102. Various attributes of a person can be detected, such as biometric attributes including facial features, voice features, bodily dimensions, and so forth.

At 1004 it is determined based on the one or more attributes whether the person other than the user is untrusted. For example, the context module 120 correlates the attributes of the person to attributes of trusted and/or untrusted persons. Whether a person is trusted or untrusted, for instance, can be defined in various ways. For instance, a user of the client device 102 can generate user profiles for known persons that are trusted and the user profiles can identify specific instances of persons based on their attributes. If attributes of a particular person do not match a profile for a known trusted person, the particular person can be specified as untrusted.

If the person is determined to be trusted ("Yes"), at 1006 a proximity alert is prevented from being output. For instance, the detection module 132 determines that detection of a trusted person within the threshold proximity to the client device 102 is not to trigger a proximity alert when the client device 102 is in the proximity mode. The method 1000 can return to 1002 and monitor attributes of persons that are detected in proximity to the client device 102.

If the person is not determined to be trusted ("No"), at 1008 an alert is output. As described previously, for example, in the proximity mode 704 the detection module 132 monitors for proximity of persons other than a user of the client device 102, such as whether such persons are within a threshold proximity to the client device 102. In the proximity alert mode, if an untrusted person other than a user of the client device 102 is detected within a threshold proximity to the client device 102, an alert can be output.

The example methods described above may be performed in various ways, such as for implementing different aspects of the systems and scenarios described herein. Any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 11:
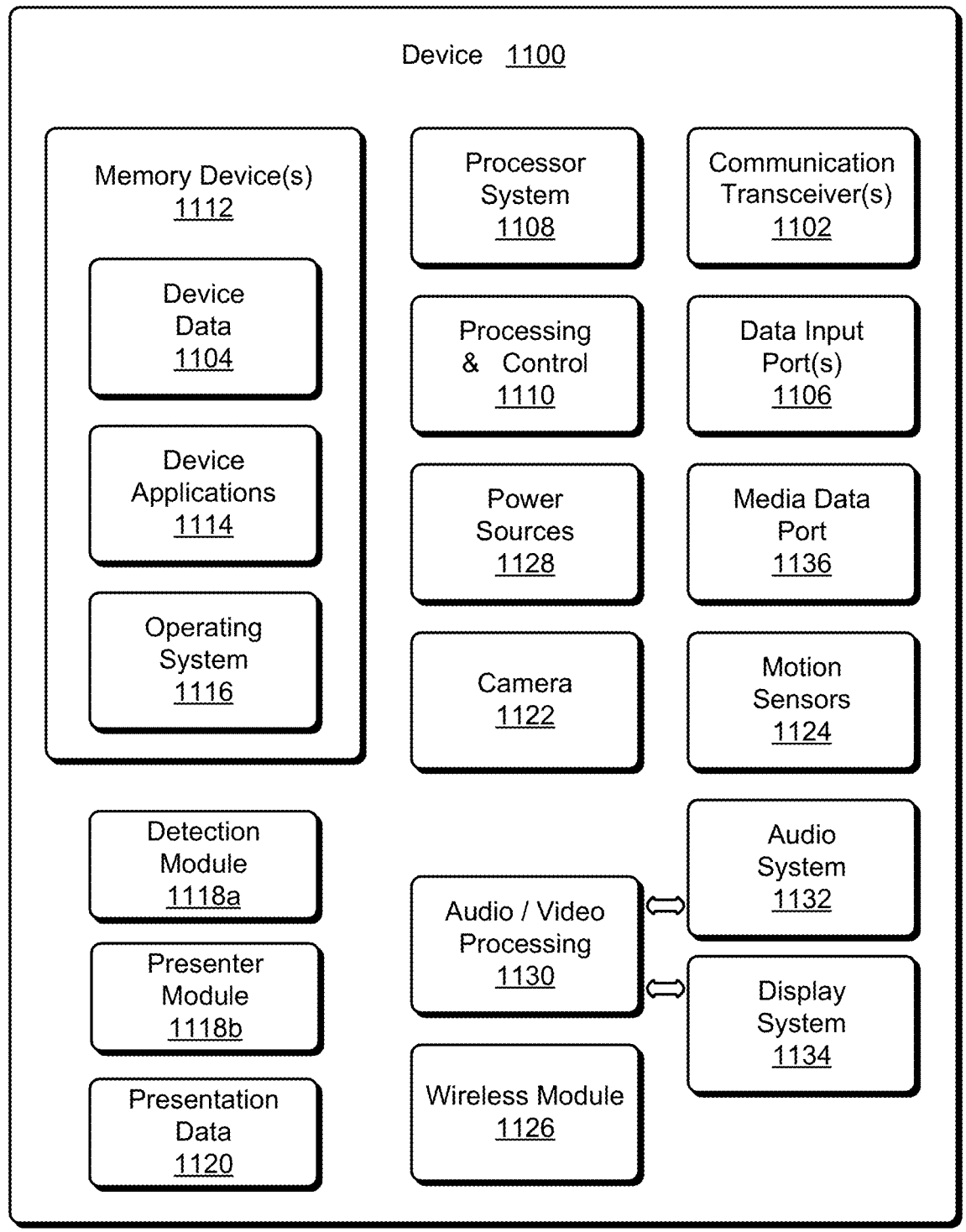
FIG. 11 illustrates various components of an example device in which aspects of managing media content and call sessions in multi-display systems can be implemented.

FIG. 11 illustrates various components of an example device 1100 in which aspects of managing media content and call sessions in multi-display systems can be implemented. The example device 1100 can be implemented as any of the devices described with reference to the previous FIGS. 1-10, such as any type of client device, mobile phone, mobile device, wearable device, tablet, computing, communication, entertainment, gaming, media playback, and/or other type of electronic device. For example, the client device 102 as shown and described with reference to FIGS. 1-10 may be implemented as the example device 1100.

The device 1100 includes communication transceivers 1102 that enable wired and/or wireless communication of device data 1104 with other devices. The device data 1104 can include any of device identifying data, device location data, wireless connectivity data, and wireless protocol data. Additionally, the device data 1104 can include any type of audio, video, and/or image data. Example communication transceivers 1102 include wireless personal area network (WPAN) radios compliant with various IEEE 902.15 (Bluetooth™) standards, wireless local area network (WLAN) radios compliant with any of the various IEEE 902.11 (Wi-Fi™) standards, wireless wide area network (WWAN) radios for cellular phone communication, wireless metropolitan area network (WMAN) radios compliant with various IEEE 902.16 (WiMAX™) standards, and wired local area network (LAN) Ethernet transceivers for network data communication.

The device 1100 may also include one or more data input ports 1106 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1100 includes a processing system 1108 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are identified at 1110. The device 1100 may further include any type of a system bus or other data and command transfer system that couples the various components within the device. A system bus can include any one or combination of different bus structures and architectures, as well as control and data lines.

The device 1100 also includes computer-readable storage memory 1112 (e.g., memory devices) that enable data storage, such as data storage devices that can be accessed by a computing device, and that provide persistent storage of data and executable instructions (e.g., software applications, programs, functions, and the like). Examples of the computer-readable storage memory 1112 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1100 may also include a mass storage media device.

The computer-readable storage memory 1112 provides data storage mechanisms to store the device data 1104, other types of information and/or data, and various device applications 1114 (e.g., software applications). For example, an operating system 1116 can be maintained as software instructions with a memory device and executed by the processing system 1108. The device applications may also include a device manager, such as any form of a control application, software application, signal-processing and control module, code that is native to a particular device, a hardware abstraction layer for a particular device, and so on. Computer-readable storage memory 1112 represents media and/or devices that enable persistent and/or non-transitory storage of information in contrast to mere signal transmission, carrier waves, or signals per se. Computer-readable storage memory 1112 do not include signals per se or transitory signals.

In this example, the device 1100 includes a detection module 1118a and a presenter module 1118b that implement aspects of for context-based display of content and alert based on distance in a multi-display system and may be implemented with hardware components and/or in software as one of the device applications 1114. For example, the detection module 1118a can be implemented as the detection module 132 and the presenter module 1118b can be implemented as the presenter module 122, described in detail above. In implementations, the detection module 1118a and/or the presenter module 1118b may include independent processing, memory, and logic components as a computing and/or electronic device integrated with the device 1100. The device 1100 also includes presentation data 1120 for implementing aspects of context-based display of content and alert based on distance in a multi-display system and may include data from the detection module 1118a and/or the presenter module 1118b.

In this example, the example device 1100 also includes a camera 1122 and motion sensors 1124, such as may be implemented in an inertial measurement unit (IMU). The motion sensors 1124 can be implemented with various sensors, such as a gyroscope, an accelerometer, and/or other types of motion sensors to sense motion of the device. The various motion sensors 1124 may also be implemented as components of an inertial measurement unit in the device.

The device 1100 also includes a wireless module 1126, which is representative of functionality to perform various wireless communication tasks. For instance, for the client device 102, the wireless module 1126 can be leveraged to scan for and detect wireless networks, as well as negotiate wireless connectivity to wireless networks for the client device 102. The device 1100 can also include one or more power sources 1128, such as when the device is implemented as a mobile device. The power sources 1128 may include a charging and/or power system, and can be implemented as a flexible strip battery, a rechargeable battery, a charged super-capacitor, and/or any other type of active or passive power source.

The device 1100 also includes an audio and/or video processing system 1130 that generates audio data for an audio system 1132 and/or generates display data for a display system 1134. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1136. In implementations, the audio system and/or the display system are integrated components of the example device. Alternatively, the audio system and/or the display system are external, peripheral components to the example device.

Although implementations of managing media content and call sessions in multi-display systems have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a client device including: a first display device positioned at a first surface of the client device and a second display device positioned at a second surface of the client device; and one or more modules implemented at least in part in hardware of the client device to: cause a first instance of media content to be output via the first display device; determine an environment in which the client device is positioned; determine a device context based on the first instance of media content and the environment in which the client device is positioned; and cause, based on the device context, a second instance of media content to be output via the second display device.

In some aspects, the techniques described herein relate to a client device, where the environment in which the client device is positioned is determined based on at least one of location, time, date, a presence of an identified person, or a presence of an identified object.

In some aspects, the techniques described herein relate to a client device, where the environment in which the client device is positioned includes a geographical location, and where the one or more modules are further implemented to generate the second instance of media content based on the geographical location.

In some aspects, the techniques described herein relate to a client device, where the environment in which the client device is positioned includes a geographical location, and where the one or more modules are further implemented to generate the second instance of media content by modifying the first instance of media content based on the geographical location.

In some aspects, the techniques described herein relate to a client device, where the environment in which the client device is positioned includes a geographical location, and where the one or more modules are further implemented to: determine a language for the geographical location; and modify the first instance of media content by translating the first instance of media content into the language to generate the second instance of media content.

In some aspects, the techniques described herein relate to a client device, where the one or more modules are implemented to determine the language for the geographical location based on position information captured by one or more sensors of the client device.

In some aspects, the techniques described herein relate to a client device, where the client device includes a first housing foldably attached to a second housing via a hinge, and where the one or more modules are further implemented to determine the device context based on an orientation of the first housing relative to the second housing.

In some aspects, the techniques described herein relate to a client device, where the device context indicates based on the orientation of the first housing relative to the second housing that the first display is viewable by a user of the client device, and the second display is viewable by a person in proximity to the client device.

In some aspects, the techniques described herein relate to a client device, where: the first surface includes a front surface of the client device, the second surface includes a rear surface of the client device, and the one or more modules are further implemented to: determine the device context based on a detected proximity of a person relative to the rear surface of the client device; and cause the second instance of media content to be output via the second display device based on the device context indicating that the detected proximity of the person is within a threshold proximity to the rear surface of the client device.

In some aspects, the techniques described herein relate to a client device, where the one or more modules are further implemented to: maintain the second display device in a deactivated mode; and transition the second display to an activated mode based on to detect that the proximity of the person is within the threshold proximity.

In some aspects, the techniques described herein relate to a system including: one or more processors; and one or more computer-readable storage media storing instructions that are executable by the one or more processors to: cause a first instance of media content to be output via a first display device positioned at a first surface of a client device; determine an environment in which the client device is positioned; determine a device context based on the first instance of media content and the environment in which the client device is positioned; and cause, based on the device context, a second instance of media content to be output via a second display device positioned at a second surface of the client device.

In some aspects, the techniques described herein relate to a system, where the instructions are further executable by the one or more processors to: cause the first instance of media content to be output via the first display device based on user input of a text string to the client device; generate a modified version of the text string based on the device context; and cause the modified version of the text string to be output via the second display device as part of the second instance of media content.

In some aspects, the techniques described herein relate to a system, where the environment in which the client device is positioned includes a geographical location, and where the instructions are further executable by the one or more processors to generate the modified version of the text string based on the geographical location.

In some aspects, the techniques described herein relate to a system, where the instructions are further executable by the one or more processors to: determine based on position data a language for the geographical location; and generate the modified version of the text string by translating the text string into the language to generate the second instance of media content.

In some aspects, the techniques described herein relate to a system, where the instructions are further executable by the one or more processors to: determine the device context based on a detected proximity of a person relative to the second display device; and cause the second instance of media content to be output via the second display device based on the device context indicating that the detected proximity of the person is within a threshold proximity to the second display device.

In some aspects, the techniques described herein relate to a system, where the instructions are further executable by the one or more processors to: maintain the second display device in a deactivated mode; and transition the second display to an activated mode based on to detect that the proximity of the person is within the threshold proximity.

In some aspects, the techniques described herein relate to a system, where the instructions are further executable by the one or more processors to: generate a machine-readable optical code that represents information pertaining to the first instance of media content; and include the machine-readable optical code as part of the second instance of media content.

In some aspects, the techniques described herein relate to a method, including: causing a first instance of media content to be output via a first display device positioned at a first surface of a client device; determining an environment in which the client device is positioned; determining a device context based on the first instance of media content and the environment in which the client device is positioned; and causing, based on the device context, a second instance of media content to be output via a second display device positioned at a second surface of the client device.

In some aspects, the techniques described herein relate to a method, further including: determining the device context based on detecting a person within a threshold proximity to the second display device; and causing, based on detecting the person within the threshold proximity to the second display device, the second display device to be activated and the second instance of media content to be output via the second display device.

In some aspects, the techniques described herein relate to a method, further including: causing at least one sensor device to capture data to determine the environment in which the client device is positioned; causing the at least one sensor to continue capturing data to detect a change in the environment in which the client device is positioned; and causing the second instance of media content to be modified and output via the second display device based on the change in the environment in which the client device is positioned.

In some aspects, the techniques described herein relate to a client device including: a sensor system including one or more sensors; and one or more modules implemented at least in part in hardware of the client device to: detect, with the sensor system, that a user is in possession of the client device; detect, with the sensor system, a person other than the user located within a threshold distance of the client device; and cause, based on the detection of the person other than the user located within the threshold distance of the client device, an alert to be output by the client device.

In some aspects, the techniques described herein relate to a client device, where the client device further includes: a first display device positioned on a first surface of the client device; and a second display device positioned on a second surface of the client device, where the one or more modules are further implemented to: detect that the user is positioned to view the first display device; and detect that the person other than the user is located within the threshold distance relative to the second display device.

In some aspects, the techniques described herein relate to a client device, where the one or more modules are further implemented to receive user input to define the threshold distance.

In some aspects, the techniques described herein relate to a client device, where the one or more modules are further implemented to cause the alert to be output by the client device based on a proximity alert mode being active on the client device.

In some aspects, the techniques described herein relate to a client device, where the one or more modules are further implemented to cause the proximity alert mode to be activated in response to user input to the client device to activate the proximity alert mode.

In some aspects, the techniques described herein relate to a client device, where the one or more modules are further implemented to: detect that the client device is located in an untrusted location; and cause the proximity alert mode to be automatically activated in response to the client device being located in the untrusted location.

In some aspects, the techniques described herein relate to a client device, where the one or more modules are further implemented to: detect that the client device is located in an untrusted location; cause the proximity alert mode to be automatically activated in response to the client device being located in the untrusted location; detect that the client device is repositioned to a trusted location; and cause the proximity alert mode to be automatically deactivated in response to the client device being positioned in the trusted location.

In some aspects, the techniques described herein relate to a client device, where the one or more modules are further implemented to: detect one or more attributes of the person other than the user located within the threshold distance of the client device; determine based on the one or more attributes that the person other than the user is untrusted; and cause, based on the detection of the person other than the user located within the threshold distance of the client device and that the person other than the user is untrusted, the alert to be output by the client device.

In some aspects, the techniques described herein relate to a client device, where the one or more modules are further implemented to: detect that the person other than the user is located outside of the threshold distance of the client device; and cause, based on detection that the person other than the user is located outside of the threshold distance of the client device, the alert to be stopped by the client device.

In some aspects, the techniques described herein relate to a client device, where the one or more modules are further implemented to: maintain multiple different threshold distances that are each associated with a different location; and determine that the client device is positioned at a particular location, and correlate the particular location with the threshold distance from the multiple different threshold distances.

In some aspects, the techniques described herein relate to a system including: one or more processors; and one or more computer-readable storage media storing instructions that are executable by the one or more processors to: detect, with a sensor system, that a user is in possession of a client device; detect, with the sensor system, a person other than the user located within a threshold distance of the client device; and cause, based on the detection of the person other than the user located within the threshold distance of the client device, an alert to be output by the client device.

In some aspects, the techniques described herein relate to a system, where the instructions are further executable by the one or more processors to cause the sensor system to identify a particular person and to cause the alert to be output by the client device to be specific to the particular person.

In some aspects, the techniques described herein relate to a system, where the instructions are further executable by the one or more processors to cause the alert to be output by the client device based on a proximity alert mode being active on the client device.

In some aspects, the techniques described herein relate to a system, where the instructions are further executable by the one or more processors to cause the proximity alert mode to be activated in response to user input to the client device to activate the proximity alert mode.

In some aspects, the techniques described herein relate to a system, where the instructions are further executable by the one or more processors to: detect that the client device is located in an untrusted location; and cause the proximity alert mode to be automatically activated in response to the client device being located in the untrusted location.

In some aspects, the techniques described herein relate to a system, where the instructions are further executable by the one or more processors to: detect that the client device is located in an untrusted location; cause the proximity alert mode to be automatically activated in response to the client device being located in the untrusted location; detect that the client device is repositioned to a trusted location; and cause the proximity alert mode to be automatically deactivated in response to the client device being positioned in the trusted location.

In some aspects, the techniques described herein relate to a system, where the instructions are further executable by the one or more processors to: detect one or more attributes of the person other than the user located within the threshold distance of the client device; determine based on the one or more attributes that the person other than the user is untrusted; and cause, based on the detection of the person other than the user located within the threshold distance of the client device and that the person other than the user is untrusted, the alert to be output by the client device.

In some aspects, the techniques described herein relate to a method, including: detecting, with a sensor system, that a user is in possession of a client device; detecting, with the sensor system, a person other than the user located within a threshold distance of the client device; and causing, based on the detection of the person other than the user located within the threshold distance of the client device, an alert to be output by the client device.

In some aspects, the techniques described herein relate to a method, further including causing the alert to be output by the client device based on a proximity alert mode being active on the client device.

In some aspects, the techniques described herein relate to a method, further including: detecting that the client device is located in an untrusted location; and cause, in response to the client device being located in the untrusted location and based on the detection of the person other than the user located within the threshold distance of the client device, the alert to be output by the client device.

The invention claimed is:

1. A client device comprising:
a first display device positioned at a first surface of the client device and a second display device positioned at a second surface of the client device; and
one or more modules implemented at least in part in hardware of the client device to:
cause a first instance of media content including text in a first language and visual content to be output via the first display device;
detect device motion and a person positioned in front of the second display device;
in response to detecting the device motion and the person positioned in front of the second display device, determine an environment, including a geographical location, in which the client device is positioned;
determine a second language that is associated with the geographical location;
determine a device context based on the first instance of media content, an application running on the first display device, the environment in which the client device is positioned, and an orientation of the first display device in relation to an orientation of the second display device;
generate a second instance of media content that is a modified version of the first instance of media content based on the device context and by translating the text in the first language in the first instance of media content from the first language into text in the second language and incorporating the text in the second language with the visual content; and
cause, based on the device context, the second instance of media content to be output including the text in the second language via the second display device while the first instance of media content is output including the text in the first language via the first display device.

2. The client device as recited in claim 1, wherein the environment in which the client device is positioned is determined based on at least one of location, time, date, a presence of an identified person, or a presence of an identified object.

3. The client device as recited in claim 2, wherein the one or more modules are further implemented to generate the second instance of media content based on the geographical location.

4. The client device as recited in claim 1, wherein the one or more modules are further implemented to generate the second instance of media content by modifying the first instance of media content based on the geographical location.

5. The client device as recited in claim 1, wherein the one or more modules are implemented to determine the second language that is associated with the geographical location based on position information captured by one or more sensors of the client device.

6. The client device as recited in claim 1, wherein the client device comprises a first housing that is foldably attached to a second housing via a hinge, and wherein the one or more modules are further implemented to determine the device context based on an orientation of the first housing in relation to the second housing.

7. The client device as recited in claim 6, wherein the device context indicates based on the orientation of the first housing in relation to the second housing that the first display device is viewable by a user of the client device, and the second display is viewable by a person in proximity to the client device.

8. The client device as recited in claim 1, wherein:
the first surface comprises a front surface of the client device, the second surface comprises a rear surface of the client device, and the one or more modules are further implemented to:
determine the device context based on a detected proximity of the person relative to the rear surface of the client device; and
cause the second instance of media content to be output via the second display device based on the device context indicating that the detected proximity of the person is within a threshold proximity to the rear surface of the client device.

9. The client device as recited in claim 8, wherein the one or more modules are further implemented to:
maintain the second display device in a deactivated mode; and
transition the second display device to an activated mode based on the detected proximity of the person being within the threshold proximity.

10. The client device as recited in claim 1, wherein the device context is based on an identity of the person.

11. The client device as recited in claim 1, wherein the visual content of the first instance of media content includes at least one of a graphic, an image, or an animation.

12. The client device as recited in claim 1, wherein the text in the first language is depicted in a style including a font and a text color, and the text in the second language is depicted in the style including the font and the text color.

13. A system comprising:
one or more processors; and
one or more computer-readable storage media storing instructions that are executable by the one or more processors to:
 cause a first instance of media content including text in a first language and visual content to be output via a first display device positioned at a first surface of a client device;
 detect device motion and a person positioned in front of a second display device;
 in response to detecting the device motion and the person positioned in front of the second display device, determine an environment, including a geographical location, in which the client device is positioned;
 determine a second language that is associated with the geographical location;
 determine a device context based on the first instance of media content, an application running on the first display device, the environment in which the client device is positioned, and an orientation of the first display device in relation to an orientation of the second display device positioned at a second surface of the client device;
 generate a second instance of media content that is a modified version of the first instance of media content based on the device context and by translating the text in the first language in the first instance of media content from the first language into text in the second language and incorporating the text in the second language with the visual content; and
 cause, based on the device context, the second instance of media content to be output including the text in the second language via the second display device positioned at the second surface of the client device while the first instance of media content is output including the text in the first language via the first display device.

14. The system of claim 13, wherein the instructions are further executable by the one or more processors to:
cause the first instance of media content to be output via the first display device based on user input of a text string to the client device;
generate a modified version of the text string based on the device context; and
cause the modified version of the text string to be output via the second display device as part of the second instance of media content.

15. The system of claim 14, wherein the environment in which the client device is positioned comprises a geographical location, and wherein the instructions are further executable by the one or more processors to generate the modified version of the text string based on the geographical location.

16. The system of claim 13, wherein the instructions are further executable by the one or more processors to:
determine the device context based on a detected proximity of the person relative to the second display device; and
cause the second instance of media content to be output via the second display device based on the device context indicating that the detected proximity of the person is within a threshold proximity to the second display device.

17. The system of claim 16, wherein the instructions are further executable by the one or more processors to:
maintain the second display device in a deactivated mode; and
transition the second display device to an activated mode based on the detected proximity of the person being within the threshold proximity.

18. The system of claim 13, wherein the instructions are further executable by the one or more processors to:
generate a machine-readable optical code that represents information pertaining to the first instance of media content; and
include the machine-readable optical code as part of the second instance of media content.

19. A method, comprising:
causing a first instance of media content including text in a first language and visual content to be output via a first display device positioned at a first surface of a client device;
detecting device motion and a person positioned in front of a second display device;
in response to detecting the device motion and the person positioned in front of the second display device, determining an environment, including a geographical location, in which the client device is positioned;
determining a second language that is associated with the geographical location;
determining a device context based on the first instance of media content, an application running on the first display device, the environment in which the client device is positioned, and an orientation of the first display device in relation to an orientation of a second display device positioned at a second surface of the client device;
generating a second instance of media content that is a modified version of the first instance of media content based on the device context and by translating the text in the first language in the first instance of media content from the first language into text in the second language and incorporating the text in the second language with the visual content; and
causing, based on the device context, the second instance of media content to be output including the text in the second language via the second display device positioned at the second surface of the client device while the first instance of media content is output including the text in the first language via the first display device.

20. The method as recited in claim 19, further comprising:
causing at least one sensor device to capture data to determine the environment in which the client device is positioned;

causing the at least one sensor device to continue capturing data to detect a change in the environment in which the client device is positioned; and causing the second instance of media content to be modified and output via the second display device based on the change in the environment in which the client device is positioned.

\* \* \* \* \*